US007010683B2

(12) United States Patent
Corella

(10) Patent No.: US 7,010,683 B2
(45) Date of Patent: *Mar. 7, 2006

(54) PUBLIC KEY VALIDATION SERVICE

(75) Inventor: Francisco Corella, Danville, PA (US)

(73) Assignee: Howlett-Packard Development Company, L.P., Houston, TX (US)

(*) Notice: Subject to any disclaimer, the term of this patent is extended or adjusted under 35 U.S.C. 154(b) by 768 days.

This patent is subject to a terminal disclaimer.

(21) Appl. No.: 09/759,443

(22) Filed: Jan. 13, 2001

(65) Prior Publication Data

US 2001/0032310 A1    Oct. 18, 2001

Related U.S. Application Data

(60) Provisional application No. 60/176,157, filed on Jan. 14, 2000.

(51) Int. Cl.
  *H04L 9/00*    (2006.01)
  *H04K 1/00*    (2006.01)
  *G06F 12/24*   (2006.01)

(52) U.S. Cl. .................. 713/156; 713/175; 713/182; 726/4; 726/5; 726/21

(58) Field of Classification Search ................ 713/156, 713/175, 182, 157, 158, 167, 191, 200, 201; 726/4, 5, 21
See application file for complete search history.

(56) References Cited

U.S. PATENT DOCUMENTS

| | | | |
|---|---|---|---|
| 4,324,645 A * | 4/1982 | Angevine et al. ............. 208/50 |
| 4,881,264 A | 11/1989 | Merkle | |
| 5,210,795 A | 5/1993 | Lipner et al. | |
| 5,224,163 A | 6/1993 | Gasser et al. | |
| 5,276,901 A | 1/1994 | Howell et al. | |
| 5,475,826 A | 12/1995 | Fischer ...................... 707/11 |
| 5,793,868 A | 8/1998 | Micali | |
| 5,796,841 A | 8/1998 | Cordery et al. | |
| 5,825,880 A * | 10/1998 | Sudia et al. ............... 713/180 |
| 5,850,442 A * | 12/1998 | Muftic ....................... 705/65 |
| 5,850,444 A * | 12/1998 | Rune ......................... 705/79 |
| 5,903,882 A | 5/1999 | Asay et al. | |
| 5,982,898 A | 11/1999 | Hsu et al. | |

(Continued)

FOREIGN PATENT DOCUMENTS

WO    WO 99/19845    4/1999

(Continued)

OTHER PUBLICATIONS

Foster, Ian. A Security Architecture for Computational Grids. ACM. San Francisco CA, 1998.

(Continued)

*Primary Examiner*—Ayaz Sheikh
*Assistant Examiner*—Christian La Forgia

(57)    ABSTRACT

A public key validation agent (PKVA) includes a registration authority which issues a first unsigned public key validation certificate (unsigned PKVC) off-line to a subject that binds a public key of the subject to a first public key serial number (PKVN). The registration authority maintains a certificate database of unsigned PKVCs in which it stores the first unsigned PKVC. A credentials server issues a disposable public key validation certificate (disposable PKVC) on-line to the subject. The disposable PKVC binds the public key of the subject from the first unsigned PKVC to the first PKVN from the first unsigned PKVC. The credentials server maintains a table that contains entries corresponding to valid unsigned PKVCs stored in the certificate database. The PKVA can be employed in a public key validation service to validate the public key of the subject before a private/public key pair of the subject is used for authentication purposes.

52 Claims, 17 Drawing Sheets

U.S. PATENT DOCUMENTS

| | | | |
|---|---|---|---|
| 5,996,076 | A | 11/1999 | Rowney et al. |
| 5,999,919 | A * | 12/1999 | Jarecki et al. ............... 705/40 |
| 6,009,177 | A * | 12/1999 | Sudia ....................... 713/191 |
| 6,023,506 | A | 2/2000 | Ote et al. |
| 6,029,150 | A | 2/2000 | Kravitz |
| 6,044,462 | A | 3/2000 | Zubeldia et al. |
| 6,058,484 | A | 5/2000 | Chapman et al. |
| 6,092,201 | A | 7/2000 | Turnbull et al. |
| 6,202,150 | B1 * | 3/2001 | Young et al. ............... 713/167 |
| 6,202,151 | B1 | 3/2001 | Musgrave et al. |
| 6,212,636 | B1 | 4/2001 | Boyle et al. |
| 6,230,266 | B1 * | 5/2001 | Perlman et al. ............ 713/158 |
| 6,233,341 | B1 | 5/2001 | Riggins |
| 6,233,577 | B1 * | 5/2001 | Ramasubramani et al. .... 707/9 |
| 6,253,322 | B1 | 6/2001 | Susaki et al. |
| 6,263,446 | B1 | 7/2001 | Kausik et al. |
| 6,282,295 | B1 * | 8/2001 | Young et al. ............... 380/286 |
| 6,324,645 | B1 * | 11/2001 | Andrews et al. ........... 713/157 |
| 6,327,578 | B1 | 12/2001 | Linehan |
| 6,367,013 | B1 * | 4/2002 | Bisbee et al. ............... 713/178 |
| 6,389,136 | B1 * | 5/2002 | Young et al. ................. 380/28 |
| 6,393,563 | B1 | 5/2002 | Maruyama et al. |
| 6,484,259 | B1 | 11/2002 | Barlow |
| 6,607,136 | B1 * | 8/2003 | Atsmon et al. ............. 235/492 |
| 2001/0037358 | A1 * | 11/2001 | Clubb et al. ................ 709/203 |
| 2002/0143710 | A1 | 10/2002 | Liu |

FOREIGN PATENT DOCUMENTS

| | | |
|---|---|---|
| WO | WO 99/35783 | 7/1999 |
| WO | WO 01/43344 | 6/2001 |

OTHER PUBLICATIONS

Wheeler, Lynn. Three Digital Signature Models . . . for x9.59. Nov. 28, 1997.

Stephen Cobb. Network World. Framingham: Jul. 7, 1997. vol. 14, Iss. 27: p. 53, 3 pgs.

Encryption Plus Folders. Encryption Plus Folders Enterprise. 2002.

Moeller, Michael. Digital IDs: offering expanded view of users: Verisgn's next Digital certificates extend electronic ID's to include personal Data. PC Week. Zipp-Davis Publishing Co. Feb. 3, 1997.

Press, Jim, "Secure Transfer of Identity and Privilege Attributes in an Open Systems Environment," Computers & Security, vol. 10, No. 2., pps. 117-127, (Apr. 1991).

"SET Secure Electronic Transaction Specification," Book 1: Business Description, Version 1.0, XP-0022031148, pps. i-72, (May 31, 1997).

A partial copy of European Search Report for Application No. EP 00 31 0771 mailed on Jul. 12, 2002 (4 pages).

R. Rivest, "Can We Eliminate Certificate Revocation Lists?," MIT Laboratory for Computer Science, pp. 178-183, (Feb. 1998). <http://therory.lcs.mit.edu/rivest>.

Menezes, "Handbook of Applied Cryptography," pps. 33, 37-39, 321-322, 559-560, 576-577, (1997).

A copy of PCT International Search Report for International Application No. PCT/US01/01520 mailed on Aug. 10, 2001 (8 pages).

International Telecommunication Union (ITU-T) Recommendation X.509, "Information Technology Open Systems Interconnection, The Directory: Authentication Framework," pp. i-81 (Jun. 1997).

M. Boe et al., "TLS-Based Telnet Security," Internet Engineering Task Force, Internet Draft, pp. 1-20, (Updated Version Oct. 24, 200, Previous Version Sep. 1998). < http://www.normos.org/ietf/draft/draft-ietf-tn3270e-telnet-tls-05.txt>.

D. Borman, "Telnet Authentication Option," Network Working Group, Request for Comments: 1416, pp. 1-7, (Feb. 1993). < http://www.csl.sony.co.jp/rfc/>.

M. Carpenter et al., "Securing FTP with TLS," Internet Engineering Task Force, Internet Draft, pp. 1-23, (Jan. 28, 1998). < http://war.jgaa.com/ftp/draft/draft-murray-auth-ftp-ssl-03.txt>.

C. Ellison et al., "SPKI Certificate Theory," Network Working Group, Request for Comments: 2693, pp. 1-43, (Updated Version Sep. 1999, Previous Version Nov. 17, 1998). < http://www.csl.sony.co.jp/rfc/>.

S. Farrell, "TLS Extensions for AttributeCertificate Based Authorization," Transport Layer Security Working Group, Internet Engineering Task Force, Internet Draft, pp. 1-11, (Aug. 20, 1998). < http://www.alternic.org/draft/draft-ietf-tls-attr-cert-01.txt>.

M. Horowitz et al., "FTP Security Extensions," Networking Working Group, Request for Comments: 2228, pp. 1-27, (Oct. 1997), < http://www.cls.sony.co.jp/rfc/>.

R. Housley et al., "FTP Authentication Using DSA," CAT Working Group, Internet Engineering Task Force, Internet Draft, pp. 1-8, (Feb. 1998). < http://www.alternic.org/draft/draft/ietf-cat-ftpdsaauth-02.txt>.

R. Housley et al., "Telnet Authenication Using DSA," Secure Telnet Working Group, Internet Engineering Task Force, Internet, Draft, 7 pages, (Jul. 1998), < http://www.alternic.org/draft/draft/housley-telnet-auth-dsa-02.txt.

J. Kohl et al., "The Kerberos Network Authenication Service (V 5)," Network Working Group, Request for Comments: 1510, pp. 1-112, (Sep. 1993). < http://www.csl.sony.co.jp/rfc/>.

S. Micali, "Efficient Certificate Revocation," Massachusetts Institute of Technology, Laboratory for Computer Science, pp. 1-10 (Mar. 22, 1996).

M. Myers et al., "X.509 Internet Public Key Infrastructure Online Certificate Status Protocol-OCSP," Network Working Group, Request for Comments: 2560, pp. 1-22, (Jun. 1999). < http://www.csl.sony.co.jp/rfc/>.

M. Naor et al., "Certificate Revocation and Certificate Update," USENIX Association, Seventh USENIX Security Symposium, pp. 217-228, (Jan. 26-29, 1998).

C. Newman, "Telnet SA SL Option," Network Working Group, Internet Engineering Task Force, Internet Draft, 6 pages, (Nov. 1998). < http://globecom.net/ietf/draft/draft-newman-telnet-sasl-01.html>.

E. Rescorla, "HTTP Over TLS," Internet Engineering Task Force, Internet Draft, pp. 1-6, (Sep. 1998). < http://www.alternic.org/draft/draft-ietf-tls-https-02.txt>.

RSA Security Inc., "RSA Keon Advanced PKI: A Security Architecture for Enabling E-Business," Solution White Paper, pp. 1-14, (1999). < http://www.rsasecurity.com/products/keon/whitepapers/advpkiwp/rsa_keon_advanced_pki_wp.pdf>.

RSA Security Inc., "Security Services Provided by the RSA Keon Desktop v5.1," White Paper, pp. 1-8, (1999). < http://www.rsasecurity.com/products/keon/whitepapers/desktop/keon_desktop_wp.pdf>.

B. Tung et al., "Public Key Cryptography for Initial Authentication in Kerberos," Internet Engineering Task Force, Internet Draft, 21 pages (Expires May 15, 1999) < http://www.alternic.org/draft/draft-ietf-cat-kerberos-pk-init-07.txt>.

Web Page of the "Simple Public Key Infrastructure (spki)," Working Group, 2 pages, (Last Modified Jan. 16, 2001), < http://www.ietf.org/html.charters/spki-charter.html>.

Web Page of the "Transport Layer Security (tls)," Working Group, 2 pages, (Last Modified Mar. 30, 2001), < http://www.ietf.org/html.charters/tis-charters.html>.

Handbook of Applied Cryptography; Alfred J. Menezes, p. 548, 1997.

Applied Cryptography; Bruce Schneier, p. 185, 1996.

Adams, C. et al., "Internet X.509 Public Key Infrastructure Certificate Management Protocols," Network Working Group, Request for Comments: 2510, pp. 1-72 (1999).

* cited by examiner

PUBLIC KEY VALIDATION SERVICE

CROSS REFERENCE TO RELATED APPLICATIONS

This patent application claims the benefit of the filing date of Provisional U.S. patent application Ser. No. 60/176,157, entitled "PUBLIC KEY VALIDATION SERVICE," having filing date of Jan. 14, 2000.

This patent application is also related to the following Non-Provisional U.S. patent applications: Ser. No. 09/483,185, entitled "AUTHORIZATION INFRASTRUCTURE BASED ON PUBLIC KEY CRYPTOGRAPHY,"; Ser. No. 09/483,189, entitled "METHOD AND APPARATUS FOR PROVIDING FIELD CONFIDENTIALITY IN DIGITAL CERTIFICATES,"; Ser. No. 09/483,356, entitled "LIGHTWEIGHT PUBLIC KEY INFRASTRUCTURE EMPLOYING DISPOSABLE CERTIFICATES," and Ser. No. 09/483,186, entitled "LIGHTWEIGHT PUBLIC KEY INFRASTRUCTURE EMPLOYING UNSIGNED CERTIFICATES," which all have a filing date of Jan. 14, 2000, are all assigned to the same assignee as the present application, and are all herein incorporated by reference.

THE FIELD OF THE INVENTION

The present invention relates to public key cryptosystems, and more particularly, to a public key validation service for validating a public key.

BACKGROUND OF THE INVENTION

Public key cryptosystems are globally deployed on the World Wide Web, as well as on a growing number of enterprise networks, for establishment of secure communication channels. Every user in a public key cryptosystem has a pair of keys including a public key and a private key. The public key is disclosed to other users while the private key is kept secret. A public key cryptosystem typically has a primary designed use, such as for encryption, digital signature, or key agreement. Public key cryptosystems are also used for user authentication. For example, a user can authenticate itself to other users by demonstrating knowledge of its private key, which other users can verify using the corresponding public key.

In an application of a public key cryptosystem for authenticating a user, the public key must be securely associated with the identity of the user that owns the public key by authenticating the public key itself. Public key certificates are typically employed to authenticate the public key. A public key certificate is a digital document, signed by a certificate authority, that binds a public key with one or more attributes that uniquely identify the owner of the public key. The public key certificate can be verified using the certificate authority's public key, which is assumed to be well known or is recursively certified by a higher authority. For example, in a corporation, a public key certificate can bind a public key to an employee number.

A public key infrastructure (PKI) refers to the collection of entities, data structures, and procedures used to authenticate public keys. A traditional PKI comprises a certificate authority, public key certificates, and procedures for managing and using the public key certificates.

One type of a user of a PKI owns the public key contained in a public key certificate and uses the certificate to demonstrate the user's identity. This type of user is referred to as the subject of the certificate or more generally as the subject.

Another type of user relies on a public key certificate presented by another user to verify that the other user is the subject of the certificate and that the attributes contained in the certificate apply to the other user. This type of user that relies on the certificate is referred to as a verifier or relying party.

The association between a public key and an identity can become invalid because the attributes that define the identity no longer apply to the owner of the public key, or because the private key that corresponds to the public key has been compromised. A PKI typically employs two complementary techniques for dissociating a public key from an identity. In the first technique, each public key certificate has a validity period defined by an expiration date, which is a substantial period from the issue date, such as one year from the issue date. In the second technique, the certificate authority revokes a public key certificate if the public key certificate's binding becomes invalid before the expiration date. One way of revoking a public key certificate is by including a serial number of the public key certificate in a certificate revocation list (CRL), which is signed and issued by the certificate authority at known periodic intervals, such as every few hours or once a day. An entity that relies on a certificate is responsible for obtaining the latest version of the CRL and verifying that the serial number of the public key certificate is not on the list.

CRLs typically become quite long very quickly. When the CRLs become long, performance is severely impacted. First, CRL retrieval consumes large amounts of network bandwidth. Second, each application has to retrieve the CRL periodically, parse the CRL, and allocate storage for the CRL. Then, the application needs to carry out a linear search of the CRL for the public key certificate serial number when the application verifies each public key certificate. As a result, conventional PKIs do not scale beyond a few thousand users.

One solution proposed to alleviate the linear search problem is to partition CRLs. The serial number of the public key certificate determines where the CRL partition is located when the public key certificate is revoked. With partitioned CRLs, the application still has to retrieve and store the entire CRL or else the application needs to fetch a CRL partition in order to verify a certificate. Since certificate verification is a likely critical path, fetching a CRL partition impacts the time it takes to run the application.

An on-line certificate status protocol (OCSP) operates by permitting the verifier of the public key certificate to ask the certificate authority if the certificate is currently valid. The certificate authority responds with a signed statement. The OCSP allows CRLs to be avoided, but requires the verifier to query the certificate authority as part of the transaction that employs the public key certificates. The verifier querying the certificate authority increases the time it takes to perform the transaction. The OCSP scheme is highly vulnerable to a denial-of-service attack, where the attacker floods the certificate authority with queries. Responding to each query is computationally expensive, because each response requires a digital signature.

In a certificate status proofs scheme, the certificate authority maintains a data structure describing the set of valid and invalid certificates in the directory. For every public key certificate that has not yet expired, a short cryptographic proof can be extracted from the data structure of the certificate's current status (i.e., valid or invalid). A CRL can essentially be viewed as a cryptographic proof of invalidity for the public key certificates in the CRL, and proof of validity for those not in the CRL. The CRL, however, is not a short proof. The short cryptographic proof can be obtained by the verifier from the directory, or it can be obtained by the subject and presented to the verifier together with the public key certificate.

The Simple Public Key Infrastructure (SPKI) working group of the Internet Society and the Internet Engineering Task Force has proposed the possibility of employing short-lived certificates as a method of achieving fine-grain control over the validity interval of a certificate. See C. M. Ellison, B. Frantz, B. Lampson, R. Rivest, B. M. Thomas and T. Ylonen, *SPKI Certificate Theory*, Request for Comments 2560 of the Internet Engineering Task Force, September 1999. The *SPKI certificate theory* reference states that there are cases in which a short-lived certificate requires fewer signatures and less network traffic than various on-line test options. The use of a short-lived certificate always requires fewer signature verifications than the use of a certificate plus on-line test result.

Nevertheless, no practical method of issuing short-lived certificates has been proposed. Traditional certificates are issued off-line, as part of a process that includes subject registration, at the rate of one per year per user. By contrast, short-lived certificates would have to be issued on-line at the rate of at least one per day per user, and perhaps as often as one every few minutes for every user.

The term on-line and the term off-line have particular definitions in the context of a PKI. The term on-line herein refers to the day-to-day usage of public key certificates and key pairs for authentication. The term off-line herein refers to the more infrequent establishment or dissolution of public key bindings, which may result in the issuing or revocation of public key certificates. For example, the traditional certificate authority is off-line, issues CRLs off-line, and places the CRLs in a directory for on-line retrieval. The scheme involving certificate status proofs also makes use of off-line certificate authorities. The OCSP is the only scheme described above that employs an on-line certificate authority.

In a traditional PKI, a public key is authenticated by a certificate signed by a certificate authority. If the private key associated with the public key is compromised, the subject of the certificate notifies the certificate authority, which revokes the certificate.

It is conceivable, however, that the same private/public key pair could be used for multiple purposes. For some purposes, the public key traditionally could be authenticated by one or more traditional certificates, issued by one or more certificate authorities. For other purposes, the public key may be known directly to one or more verifiers, and thus may not have to be authenticated.

If a private/public key pair is used for multiple purposes, when the private key is compromised it becomes necessary to prevent further use of the key pair for any of the multiple purposes. Revoking a single certificate is no longer sufficient to prevent all uses of the private/public key pair. Thus, it would be desirable to provide a practical way for a single action taken by the owner of the private/public key pair to prevent any further use of the key pair that would allow an impostor to masquerade as the legitimate owner of the key pair.

Ecommerce Scenario

It would be desirable in an ecommerce scenario to have multiple uses of a single public/private key pair. In current ecommerce applications, the retailer's web server demonstrates its identity using a public/private key pair and a public key certificate signed by a certificate authority whose public key is configured into the browsers. The customer, on the other hand, demonstrates the customer's identity by a password, sent encrypted after a Secure Sockets Layer (SSL) connection has been established between the browser and the server. The password is established when the customer registers with the retailer's ecommerce site, and is used to identify the customer on repeat visits to the site.

Although passwords are sent encrypted, this use of passwords is vulnerable because customers are likely to use the same password to access all sites. An insider attack at one web site may provide the attacker with passwords that can be used to masquerade for users at other sites, such as at popular sites where most ecommerce customers have an account. An attacker could also set up a fake ecommerce site with the only purpose of collecting passwords from customers in order to access those customers' accounts at other sites.

Because of this vulnerability of passwords, there is a need for the use of public key cryptography for client authentication, in addition to its current use for web server authentication. The SSL protocol allows the web browser to submit a client certificate to the server and to demonstrate knowledge of the private key associated with the public key contained in the certificate. The private key may be stored in a smart card for protection against software attack.

The traditional PKI paradigm for ecommerce calls for the client certificate to be signed by a certificate authority independent of any particular ecommerce retailer, such as by a commercial certificate authority (e.g., Verisign). However, it is unlikely that an ecommerce site will accept a certificate issued by a third party certificate authority, because the ecommerce site would have to trust the certificate authority to establish the identity of the customer. Ecommerce retailers have developed their own processes for registering customers, tailored to their specific needs. Thus, ecommerce retailers are unlikely to abandon their own processes and rely instead on registration by one or more third party certificate authorities over which they have no control.

Therefore, there is a desire for an alternative PKI paradigm for ecommerce in which the customer could register the customer's public key directly with the ecommerce site, as part of the customer registration process. It is desirable that in such an alternative PKI paradigm that the customer could provide the customer's public key, instead of a password, when registering with the site. To avoid modifying SSL, it would be desirable to have the customer send the public key in a self-signed client certificate.

In such ecommerce scenario, each customer has a private/public key pair, with the private key safely stored and used in a smart card, and registers the public key with many different ecommerce sites. Thus, the private/public key pair is used for many purposes. When the private key is compromised, the customer must prevent use of the private/public key pair at all ecommerce sites where the customer has registered the public key, and just remembering these sites could be a difficult task for the customer. Thus, there is a need for a new mechanism which allows the customer to prevent further use of the private/public key pair at all sites by taking a single action.

Ron Rivest, R. L. Rivest, *Can we Eliminate Certificate Revocation Lists?*, Proceedings of Financial Cryptography, 1998, ("the Rivest Reference") has proposed a way of preventing use of a private/public key pair after the private key has been compromised. The method proposed in the Rivest Reference makes use of an association of suicide bureaus. The owner of a private/public key pair registers the public key with a suicide bureau. When the private/public key is compromised, the owner signs a suicide note using the private key and sends the suicide note to the suicide bureau, which broadcasts the suicide note to the association. While the private key is not compromised, the owner can obtain a certificate of health for the public key and present it to a verifier together with a public key certificate. The certificate of health is a digital document signed by the suicide bureau asserting that the suicide bureau has registered the public key and is not aware of any suicide note for that public key.

One drawback of the suicide bureau method proposed in the Rivest Reference is that after the legitimate owner of a private/public key pair has registered the public key with a first suicide bureau, an attacker can register the same public key with a different suicide bureau, in anticipation of gaining knowledge of the private key. If the attacker later does gain knowledge of the private key, and the compromise is detected, the legitimate owner of the private/public key pair will send a suicide note to the first suicide bureau, but the attacker may still obtain a certificate of health from the second suicide bureau. To prevent this, all suicide bureaus must belong to a single association and must be linked by a reliable broadcast network, which will be difficult to achieve in practice. The second suicide bureau must listen on the network and invalidate its record of the private key, even though the suicide note is for a public key that had been registered with the first suicide bureau.

A second drawback of the proposed suicide bureau method is that after a public key has been compromised and the suicide note has been broadcast to all suicide bureaus, an attacker could register the public key in a new registration with the same or with a different suicide bureau, and could then obtain certificates of health based on the new registration. To prevent this, every suicide bureau must maintain a perfect record of every public key registered in any suicide bureau for which a suicide note has ever been issued. This, again, is difficult to achieve in practice.

A third method drawback of the proposed suicide bureau method is that the method is only applicable to private/public key pairs that belong to a signature cryptosystem, because the private key must be used to sign the suicide note. In particular, the method cannot be used for key pairs belonging to the Diffie-Hellman (DH) cryptosystem, since a Diffie-Hellman private key cannot be used to sign documents.

Thus, there is a need for an improved way of preventing use of a private/public key pair after the private key has been comprised which does not have the above drawbacks of the suicide bureau method proposed in the Rivest Reference.

SUMMARY OF THE INVENTION

One aspect of the present invention provides a public key validation agent (PKVA) including an off-line registration authority and an on-line credentials server. The registration authority issues a first unsigned public key validation certificate (unsigned PKVC) off-line to a subject that binds a public key of the subject to a first public key serial number (PKVN). The registration authority maintains a certificate database of unsigned PKVCs in which it stores the first unsigned PKVC. The credentials server issues a disposable public key validation certificate (disposable PKVC) on-line to the subject. The disposable PKVC binds the public key of the subject from the first unsigned PKVC to the first PKVN from the first unsigned PKVC. The credentials server maintains a table that contains entries corresponding to valid unsigned PKVCs stored in the certificate database.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention relates to a public key validation service (PKVS) for validating a subject's public key before using the subject's private/public key pair for authentication purposes. The PKVS of the present invention is better understood by first describing a lightweight PKI employing disposable certificates, such as described in the above incorporated co-pending Patent Application entitled "LIGHTWEIGHT PUBLIC KEY INFRASTRUCTURE EMPLOYING DISPOSABLE CERTIFICATES."

Lightweight Public Key Infrastructure Employing Disposable Certificates

Figure 1:
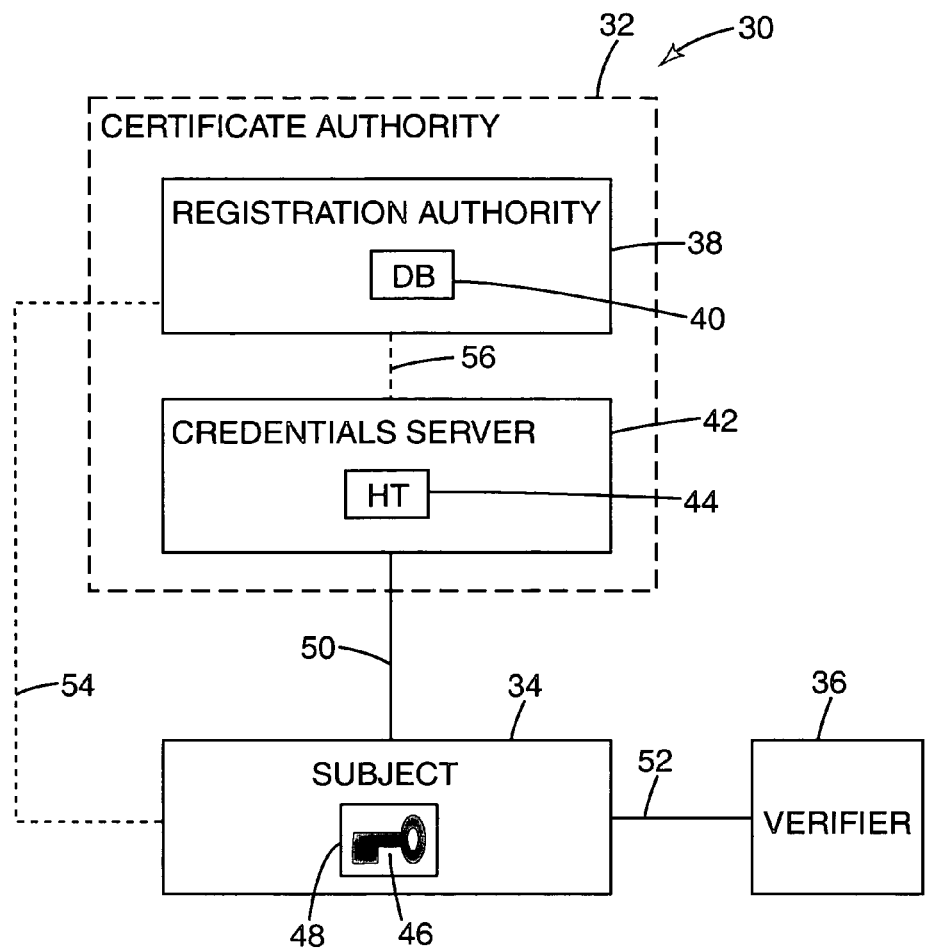
FIG. 1 is a block diagram of a lightweight public key infrastructure (PKI) employing short-term disposable certificates.

A lightweight public key infrastructure (PKI) is illustrated generally at 30 in FIG. 1. PKI 30 includes several main components which are each a software program. The main software program components of PKI 30 run on one or more computer systems. In one embodiment, each of the main software program components runs on its own computer system.

A certificate authority 32 issues short-term disposable certificates to one or more subjects, such as subject 34. Subject 34 is a user which owns a public key contained in the short-term disposable certificate and uses the short-term disposable certificate to demonstrate the subject's identity to one or more verifiers, such as verifier 36, by demonstrating that the subject has knowledge of a private key corresponding to the public key in the short-term disposable certificate. Verifier 36 is a user which relies on the short-term disposable certificate presented by subject 34 to verify that subject 34 is the subject of the short-term disposable certificate and that the attributes contained in the short-term disposable certificate apply to subject 34. In some embodiments of PKI 30, the same user can play the role of subject 34 and verifier 36 in different situations.

PKI 30 does not issue traditional long-term certificates, such as issued by conventional PKIs. Traditional long-term certificates typically have a validity period defined by an expiration date, which is a substantial period from the issue date, such as one year from the issue date. A conventional certificate authority needs to revoke a traditional long-term certificate if the public key certificate binding becomes invalid before the expiration date. As discussed in the Background of the Invention section of the present specification, a variety of methods have been used to revoke traditional long-term certificates, such as by using a certificate revocation list (CRL) or an on-line certificate status protocol (OCSP).

By contrast to traditional long-term certificates, the short-term disposable certificates issued by certificate authority 32 are not subject to revocation. The short-term disposable certificates are referred to as being disposable, because subject 34 can throw them away after a few uses. As a result, in one embodiment, the short-term disposable certificates are stored in volatile memory and are not saved to a disk. PKI 30 is referred to as being a lightweight PKI because it is substantially simpler and more efficient than a conventional PKI.

A short-term disposable certificate is herein defined as a public key certificate that binds the subject's public key to one or more names or identifiers and has a short validity period determined by an expiration date/time. An example validity period for a short-term disposable certificate is one day, a few hours, or even a few minutes. Since the validity period is quite short, revocation is not necessary. Subject 34 requests a fresh short-term disposable certificate as needed and submits it to verifier 36. Verifier 36 only needs to check the expiration date/time to verify that the short-term disposable certificate is valid.

From the point of view of verifier 36, the use of short-term disposable certificates is a much better scheme than using traditional long-term certificates, because verifier 36 only has to verify a signature of the short-term disposable certificate and check the expiration date/time of the short-term disposable certificate. Since the certificate validation work of verifier 36 is likely to be a critical path in the overall work of verifier 36, short-term disposable certificates are a good solution for the verifier. In many cases, the verifier is a performance bottleneck and thus short-term disposable certificates are a good overall solution for PKI 30.

Certificate authority 32 includes a registration authority 38 that maintains a certificate database (DB) 40 containing unsigned certificates. Certificate authority 32 also includes a credentials server 42 that maintains a hash table (HT) 44 containing cryptographic hashes of unsigned certificates.

Registration authority 38 is an off-line component of certificate authority 32 and is responsible for subject registration and for maintaining certificate database 40. Each unsigned certificate in certificate database 40 binds a public key of a subject to one or more attributes that uniquely identify the subject.

Credentials server 42 is an on-line component of certificate authority 32 and is responsible for issuing the short-term disposable certificates and for maintaining the list of cryptographic hashes of currently valid unsigned certificates in hash table 44. Each cryptographic hash in hash table 44 is computed from an unsigned certificate using an agreed upon collision-resistant hash function, such as SHA-1 or MD5. Hash table 44 is essentially a list of the currently valid unsigned certificates which is keyed by the cryptographic hash. Cryptographic hashes function well as keys for hash table 44, because cryptographic hashes behave statistically as random quantities.

Subject 34 has a private-key 46 stored in a secure storage medium 48, such as a smartcard or secure software wallet. Subject 34 also has a public key mathematically associated with private key 46. Subject 34 registers the public key corresponding to private key 46 with registration authority 38 by sending the public key and one or more attributes that uniquely identify subject 34's identity to registration authority 38 and demonstrating that the identification attributes apply to subject 34. Examples of such identification attributes include name, social security number, and employee number.

The components of PKI 30 are linked by one or more computer networks. A network connection 50 couples credentials server 42 and subject 34. A network connection 52 couples subject 34 and verifier 36. Network connections 50 and 52 are shown as solid lines in FIG. 1 and are used for on-line communications. A network connection 54 couples registration authority 38 and subject 34. A network connection 56 couples registration authority 38 and credentials server 42. Network connections 54 and 56 are represented as dotted lines in FIG. 1 and are used for off-line communications. Registration authority 38 is only involved in off-line communications and communicates through off-line network connections 54 and 56. On the other hand, credentials server 42 is involved in on-line communications through network connection 50.

Figure 2:
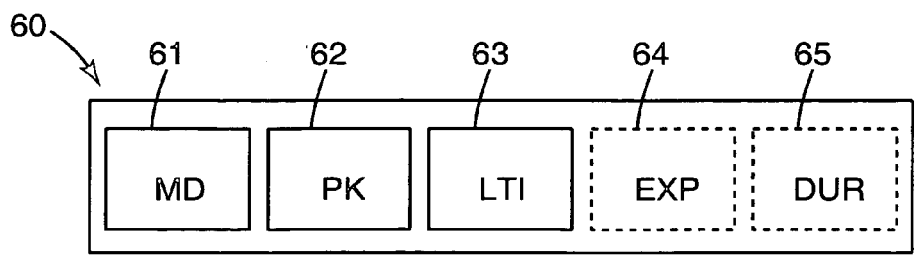
FIG. 2 is a diagram of an unsigned certificate issued from a registration authority of the PKI of FIG. 1.

One embodiment of an unsigned certificate issued by registration authority 38 is illustrated generally at 60 in FIG. 2. Unsigned certificate 60 includes a meta-data (MD) field 61 containing data about unsigned certificate 60 itself rather than data related to the subject. Examples of data stored in meta-data field 61 include serial number and issuer name. Unsigned certificate 60 includes a subject's public key (PK) 62. Unsigned certificate 60 includes long-term identification information (LTI) field 63 containing attributes uniquely identifying subject 34, such as the subject's name, the subject's social security number, or the subject's employee number.

Unsigned certificate 60 optionally includes a long-term expiration (EXP) field 64 which contains a date/time of expiration for unsigned certificate 60. The expiration date/time contained in long-term expiration field 64 is useful for administrative purposes, but is not required for proper functioning of PKI 30. By contrast, in a conventional PKI, the expiration date is required to reduce the size of the CRL as revoked certificates reach their expiration dates. Unsigned certificate 60 optionally includes a duration (DUR) field 65 that specifies a duration for the validity period of any short-term disposable certificates issued against unsigned certificate 60.

Figure 3:
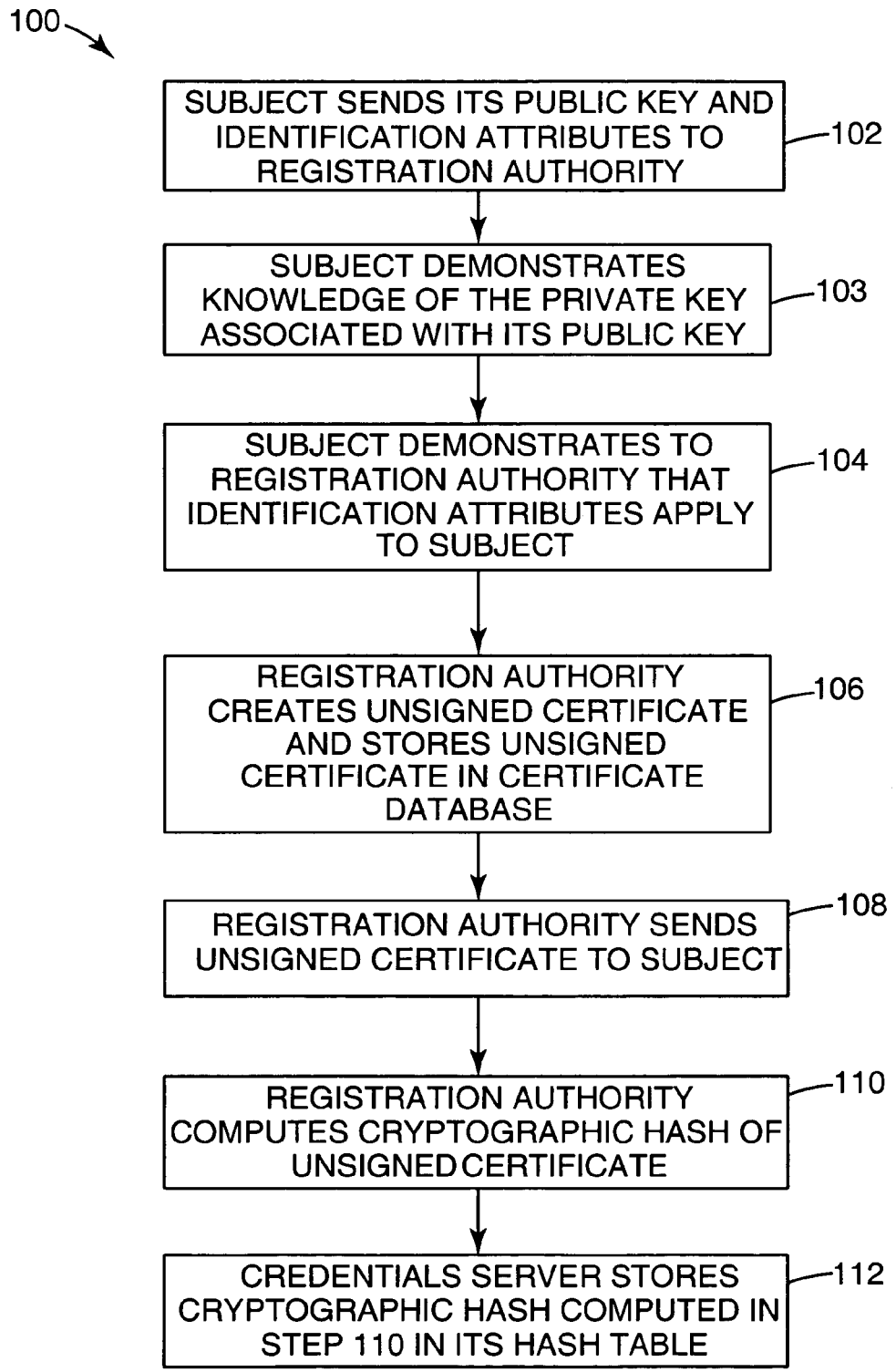
FIG. 3 is a flow diagram of an off-line protocol for issuing an unsigned certificate from a registration authority of the PKI of FIG. 1.

An off-line protocol for issuing unsigned certificate 60 from registration authority 38 is illustrated generally at 100 in FIG. 3. At step 102, subject 34 sends its public key and one or more attributes that uniquely identify subject 34 to registration authority 38.

At step 103, subject 34 demonstrates knowledge of the private key 46 associated with the subject 34's public key. Step 103, is performed in a way that depends on the cryptosystem for which the private-public key pair has been generated by subject 34. For example, in a digital signature cryptosystem, subject 34 demonstrates knowledge of the private key 46 by using private key 46 to digitally sign a quantity derived from a random quantity generated by registration authority 38. Registration authority 38 then verifies this digital signature using subject 34's public key.

At step 104, subject 34 demonstrates to registration authority 38, by out-of-band administrative means, that the identification attributes sent in step 102 apply to subject 34.

At step 106, registration authority 38 creates unsigned certificate 60 and stores unsigned certificate 60 in certificate database 40. At step 108, registration authority 38 sends unsigned certificate 60 to subject 34.

At step 110, registration authority 38 computes a cryptographic hash of unsigned certificate 60 using an agreed upon collision-resistant hash function, such as SHA-1 or MD5. In step 110, registration authority 38 sends the computed cryptographic hash of unsigned certificate 60 to credential server 42 over network connection 56, which provides data integrity protection, such as with a Secure Sockets Layer (SSL) connection.

At step 112, credentials server 42 stores the cryptographic hash of unsigned certificate 60 computed in step 110 in hash table 44.

Figure 4:
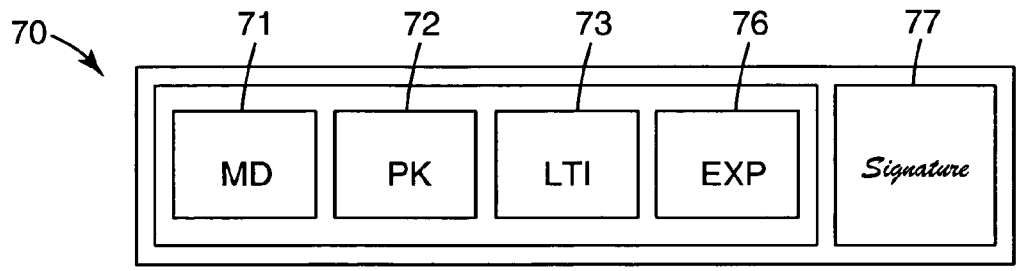
FIG. 4 is a diagram of a non-structured short-term disposable certificate as issued by a credentials server of the PKI of FIG. 1.

One embodiment of a short-term disposable certificate as issued by credentials server 42 is illustrated generally at 70 in FIG. 4. Short-term disposable certificate 70 includes a meta-data (MD) field 71 containing data about short-term disposable certificate 70 rather than the subject of short-term disposable certificate 70. Short-term disposable certificate 70 includes a public key (PK) 72 which is the same public key as public key 62 of unsigned certificate 60. The subject of unsigned certificate 60 and short-term disposable certificate 70 has only one private-public key pair associated with private key 46 stored in smartcard or secure software wallet 48. Short-term disposable certificate 70 includes long-term identification information (LTI) field 73 containing attributes uniquely identifying subject 34. Long-term identification information field 73 is identical to long-term identification information field 63 of unsigned certificate 60.

Short-term disposable certificate 70 also includes a short-term expiration (EXP) field 76 that specifies a date and time of expiration for a short-term disposable certificate 70. In one embodiment where unsigned certificate 60 contains a duration field 65 that specifies a duration for the validity period of the short-term disposable certificates issued therefrom, the date and time specified by short-term expiration field 76 is obtained by adding the duration specified by duration field 65 to the date and time at which short-term disposable certificate 70 is issued by credentials server 42. In one embodiment, the duration of the validity period of short-term disposable certificate 70 is not explicitly specified by a duration field 65 in unsigned certificate 60. In this embodiment, the duration of the validity period of short-term disposable certificate 70 is set by a policy.

Short-term disposable certificate 70 also includes a signature field 77 containing a signature of credentials server 42. The signature in signature field 77 is made by credentials server 42 on the sequence of fields 71, 72, 73, and 74, as well as, if necessary, the specification of the cryptosystem that has been used to produce the signature and must be used to verify the signature.

In one embodiment, short-term disposable certificate 70 is implemented with an X.509v3 certificate.

Figure 5:
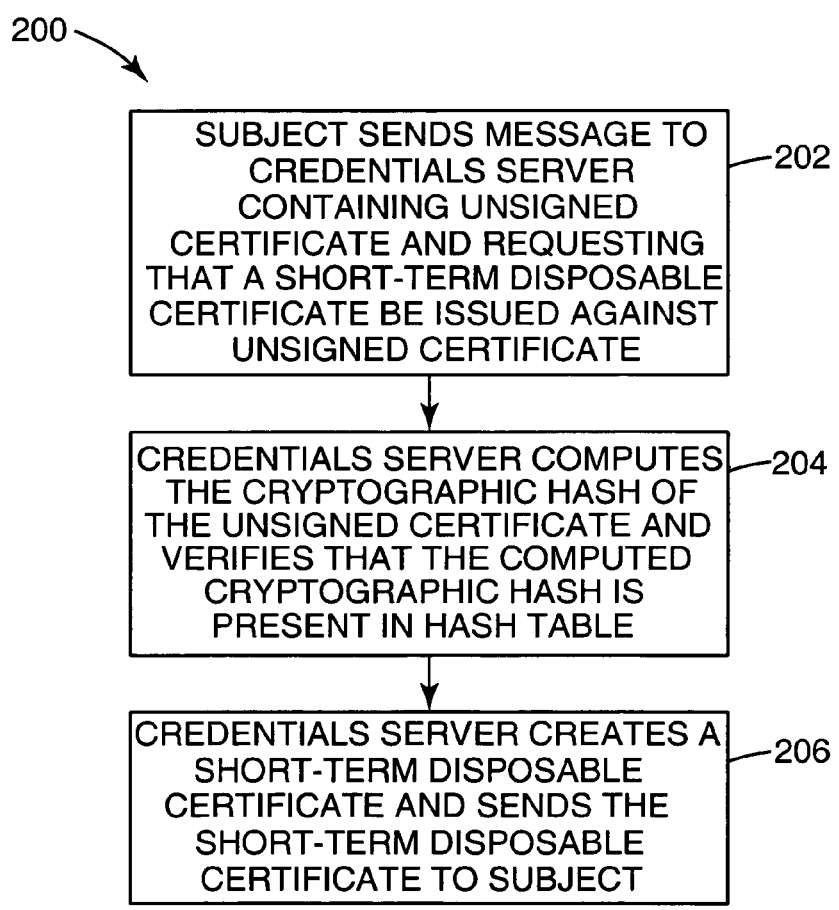
FIG. 5 is a flow diagram illustrating an on-line protocol for issuing a short-term disposable certificate from a credentials server of the PKI of FIG. 1.

An on-line protocol for issuing a short-term disposable certificate 70 to subject 34 from credentials server 42 against unsigned certificate 60 is generally illustrated at 200 in FIG. 5. At step 202, subject 34 sends a message to credentials server 42 containing unsigned certificate 60 and requesting that a short-term disposable certificate be issued against unsigned certificate 60.

At step 204, credentials server 42 computes a cryptographic hash of unsigned certificate 60 by the agreed upon collision-resistant hash function. In step 204, credentials server 42 then verifies that the computed cryptographic hash is present in hash table 44. At step 206, credentials server 42 creates short-term disposable certificate 70 and sends short-term disposable certificate 70 to subject 34.

In step 204, credentials server 42 performs the hash table 44 look-up with an efficient and computationally inexpensive operation. The signature operation performed by credentials server 42 in step 206 to create short-term disposable certificate 70, however, is a computationally expensive operation. Nevertheless, step 206 with the computationally expensive signature operation is only performed if the look-up of hash table 44 succeeds. The impact of a denial-of-service attack against credentials server 42 is reduced by only performing step 206 if the look-up in step 204 succeeds.

Figure 6:
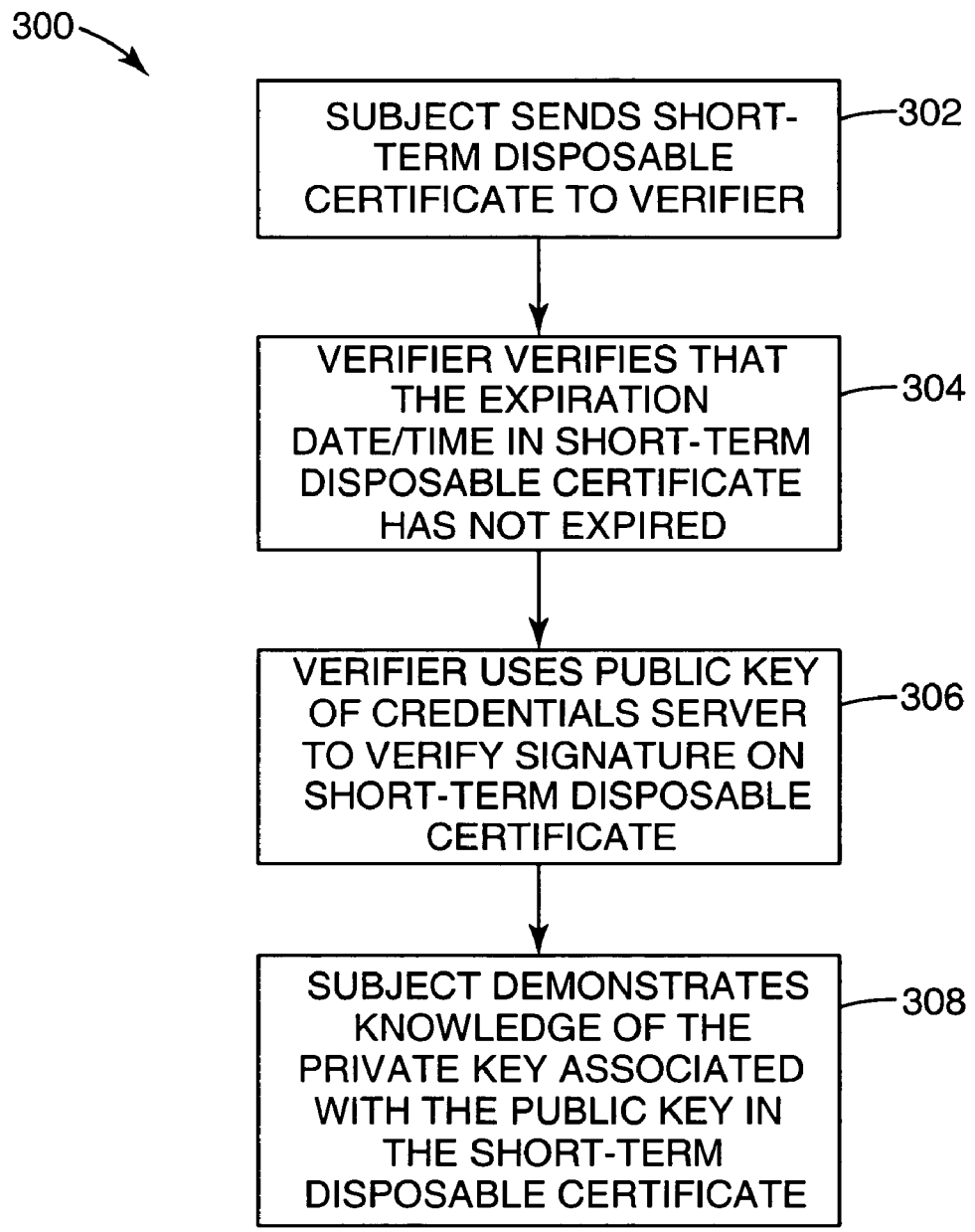
FIG. 6 is a flow diagram illustrating an on-line protocol for a subject to demonstrate its identity to a verifier of the PKI of FIG. 1.

An on-line protocol employed by subject 34 to demonstrate its identity to verifier 36 is illustrated generally at 300 in FIG. 6. At step 302, subject 34 sends the issued short-term disposable certificate 70 to verifier 36. At step 304, verifier 36 verifies that the expiration date and time specified in short-term expiration field 76 of short-term disposable certificate 70 has not been reached.

At step 306, verifier 36 uses a public key of credentials server 42 to verify the signature in signature field 77 of short-term disposable certificate 70. Verifier 36 knows the public key of credentials server 42 either directly or through certification by a higher certificate authority.

At step 308, subject 34 demonstrates knowledge of the private key 46 associated with the public key 72 contained in short-term disposable certificate 70. Step 308 is performed in a way that depends on the cryptosystem for which the private/public key pair has been generated by subject 34. For example, in a digital signature cryptosystem, subject 34 demonstrates knowledge of the private key 46 by using private key 46 to digitally sign a quantity derived from a random quantity generated by verifier 36. Verifier 36 then verifies this digital signature using the public key 72 in short-term disposable certificate 70.

Subject 34 can delete short-term disposable certificate 70 when the short-term disposable certificate expires, because subject 34 can obtain a new short-term disposable certificate by sending the unsigned certificate to credentials server 42. In one embodiment subject 34 stores short-term disposable certificate in volatile memory and does not save it to disk.

Figure 7:
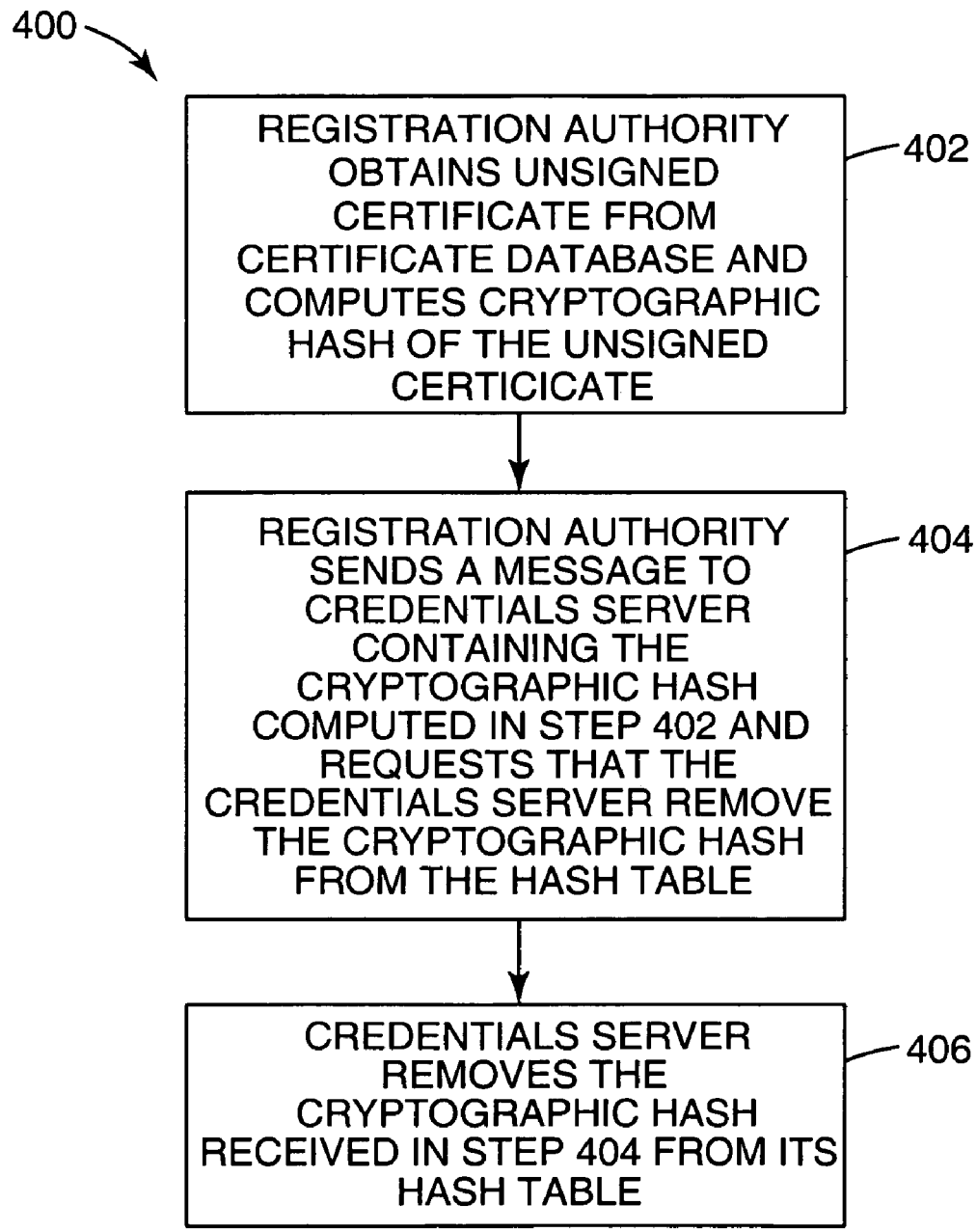
FIG. 7 is a flow diagram illustrating a protocol for a registration authority to revoke an unsigned certificate for the PKI of FIG. 1.

An off-line protocol for revoking unsigned certificate 60 is illustrated generally at 400 in FIG. 7. Off-line protocol 400 is performed when subject 34's private key 46 is compromised or the identification attributes in long-term identification information field 63 no longer apply to subject 34, because in either case the binding of public key 62 to the identification attributes is invalid.

At step 402, registration authority 38 retrieves unsigned certificate 60 from certificate database 40 and computes a cryptographic hash of unsigned certificate 60 using the agreed upon collision-resistant hash function. In one embodiment, registration authority 38 marks unsigned certificate 60 in certificate database 40 as being invalid, for auditing purposes. In an alternative embodiment, where retention of unsigned certificate 60 in certificate database 40 is not required for auditing purposes, registration authority 38 deletes unsigned certificate 60 from certificate database 40.

At step 404, registration authority 38 sends a message to credentials server 42 containing the cryptographic hash of unsigned certificate 60 computed in step 402. The message sent in step 404 also requests that credentials server 42 remove the corresponding cryptographic hash of unsigned certificate 60 from hash table 44.

At step 406, credentials server 42 removes the cryptographic hash of unsigned certificate 60 from hash table 44 which corresponds to the cryptographic hash sent in the message from registration authority 38 in step 404. After step 406 is completed, credentials server 42 no longer issues short-term disposable certificates 70 against unsigned certificate 60. Consequently, once protocol 400 has been executed, neither subject 34 nor an attacker can obtain a short-term disposable certificate by presenting unsigned certificate 60 to credentials server 42.

Figure 8:
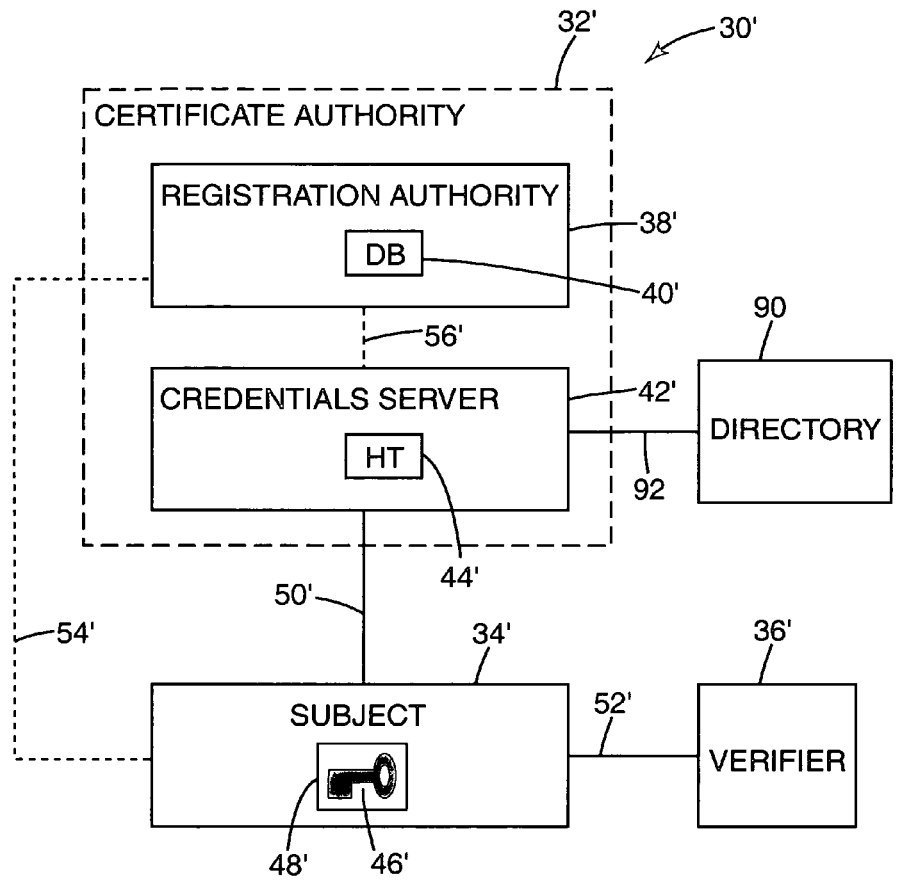
FIG. 8 is a block diagram of a lightweight PKI employing short-term disposable certificates for authorization.

An alternate embodiment lightweight PKI is illustrated generally at 30' in FIG. 8. The PKI 30' components 32', 34', 36', 38', 40', 42', 44', 46', 48', 50', 52', 54', and 56' generally operate and are generally coupled substantially the same as the corresponding PKI 30 components 32, 34, 36, 38, 40, 42, 44, 46, 48, 50, 52, 54, and 56 described above.

PKI 30', however, includes a directory 90. In one embodiment, directory 90 is a lightweight directory access protocol (LDAP) directory. PKI 30' also includes a network connection 92 to couple credentials server 42' to directory 90 to permit credentials server 42' to access directory 90. Credentials server 42' obtains short-term authorization information stored in directory 90. Credentials server 42' adds the short-term authorization information obtained from directory 90 to short-term disposable certificates issued by credentials server 42', in a similar manner as described in co-pending application entitled, "AUTHORIZATION INFRASTRUCTURE BASED ON PUBLIC KEY CRYPTOGRAPHY," which is incorporated by reference above, to create shortterm credentials certificates which can be employed for authorization of subject 34'.

The short-term authorization information data contained in directory 90 relates to attribute or authorization information about subject 34'. Example short-term authorization information includes expense authorization limit for an enterprise application, co-payment amount for an insurance application, disk storage quota for an Information Technology (IT) application, and user ID plus Group ID for Unix access application.

In PKI 30', verifier 36' is an application program running on a server computer system and subject 34' is a client program that uses the application.

Unsigned certificates issued by registration authority 38' are substantially similar to the unsigned certificates issued by registration authority 38, such as unsigned certificate 60 of FIG. 2.

PKI 30' employs off-line protocol 100 illustrated in FIG. 3 for issuing unsigned certificate 60 from registration authority 38. In addition, PKI 30' employs off-line protocol 400 illustrated in FIG. 7 for registration authority 38' to revoke unsigned certificate 60.

Figure 9:
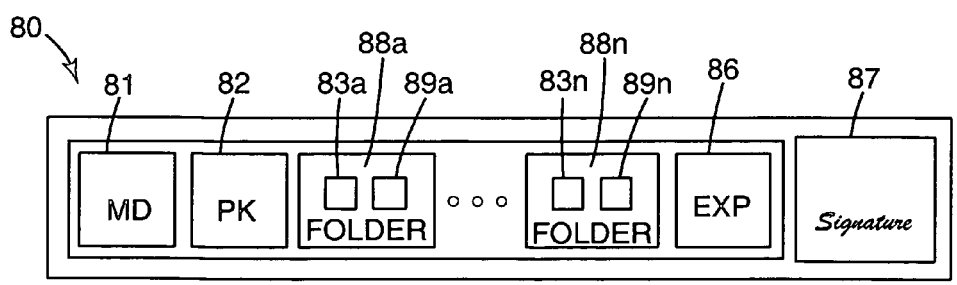
FIG. 9 is a diagram of a structured short-term disposable certificate as issued by a credentials server of the PKI of FIG. 8.

One embodiment of a structured short-term disposable certificate issued by credentials server 42' is illustrated generally at 80 in FIG. 9. Short-term disposable certificate 80 is a structured certificate, such as the structured certificates defined and described in co-pending application entitled, "METHOD AND APPARATUS FOR PROVIDING FIELD CONFIDENTIALITY IN DIGITAL CERTIFICATES," which is incorporated by reference above. Structured short-term disposable certificate 80 includes a meta-data field (MD) field 81, a public key (PK) 82, a short-term expiration field 86, and a signature field 87, which are substantially similar to meta-data field 71, public key 72, short-term expiration field 76 and signature field 77 of non-structured short-term disposable certificate 70 of FIG. 4. Structured short-term disposable certificate 80, however, includes folders 88a through 88n, which respectively correspond to applications 36'a through 36'n. For every verifier/application 36' that the subject/client 34' can access, as specified, for example, by a user profile, there is a cryptographic folder 88. Each cryptographic folder 88 contains long-term identification information 83 and/or short-term authorization information 89 as required by the corresponding verifier/application 36' to make authorization decisions about the subject/client 34'. In one embodiment, structured short-term disposable certificate 80 is implemented by adding a folder extension to an X.509v3 certificate.

Figure 10:
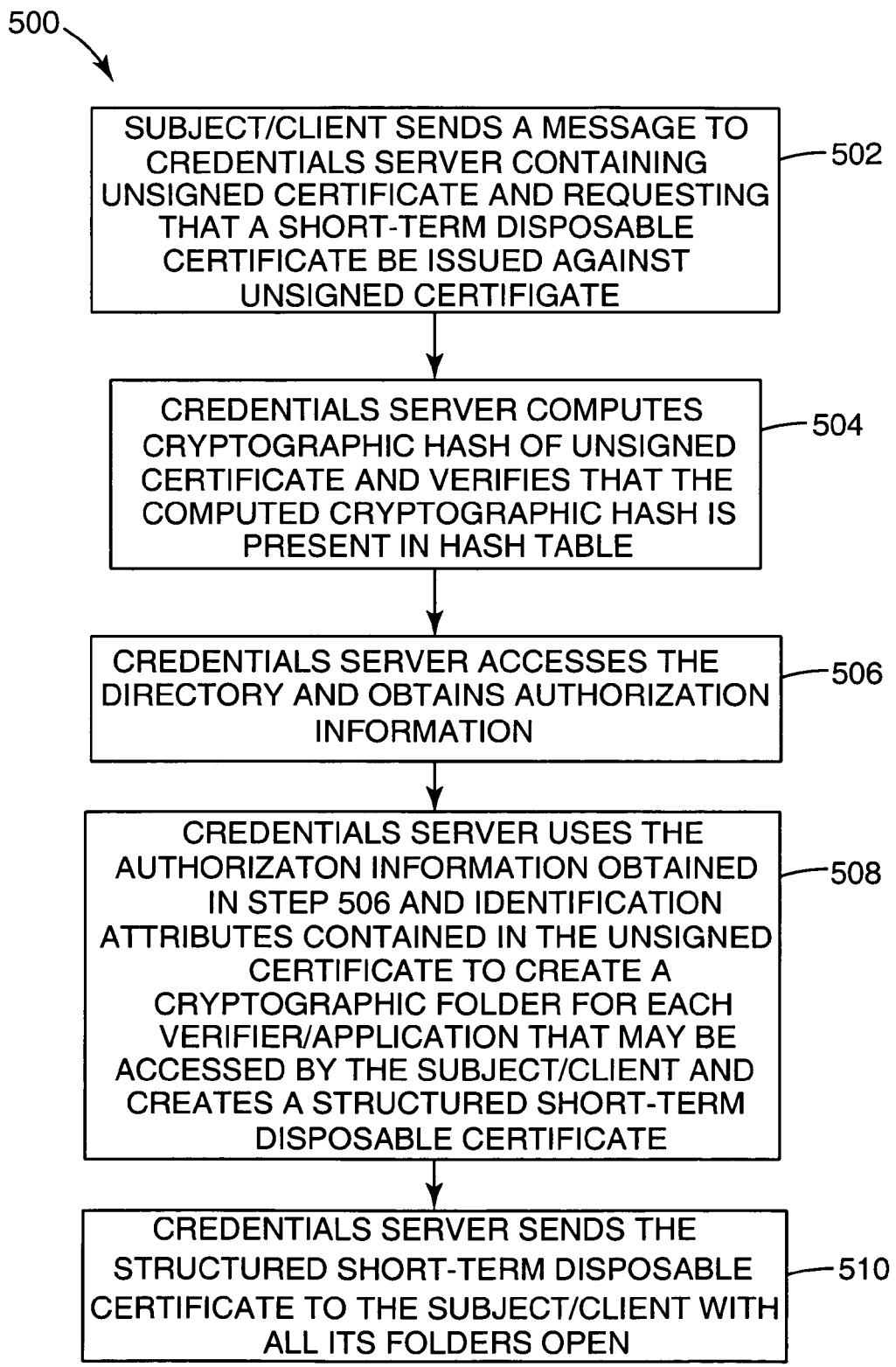
FIG. 10 is a flow diagram illustrating an on-line protocol for issuing a structured short-term disposable certificate from a credentials server of the PKI of FIG. 8.

An on-line protocol for issuing a structured short-term disposable certificate 80 to subject/client 34' from credentials server 42' against unsigned certificate 60 is generally illustrated at 500 in FIG. 10. At step 502, subject/client 34' sends a message to credentials server 42' containing unsigned certificate 60 and requesting that a short-term disposable certificate be issued against unsigned certificate 60.

At step 504, credentials server 42' computes a cryptographic hash of unsigned certificate 60 with an agreed upon collision-resistant hash function. In step 504, credentials server 42' then verifies that the computed cryptographic hash is present in hash table 44'.

At step 506, credentials server 42' accesses directory 90 via network connection 92 and obtains short-term authorization information for structured short-term disposable certificate 80.

At step 508, credentials server 42' combines the short-term authorization information obtained from directory 90 in step 506 with the identification attributes in long-term identification information field 63 of unsigned certificate 60. In step 508, credentials server 42' creates a cryptographic folder 88 for each verifier/application 36' that can be accessed by subject/client 34', where each cryptographic folder 88 contains all the long-term identification information and/or short-term authorization information required by verifier/application 36' to make authorization decisions about subject/client 34'. In step 508, credentials server 42' uses the cryptographic folders 88 to create structured short-term disposable certificate 80.

At step 510, credentials server 42' sends structured short-term disposable certificate 80 to subject/client 34', with all of the short-term disposable certificate's folders open.

Figure 11:
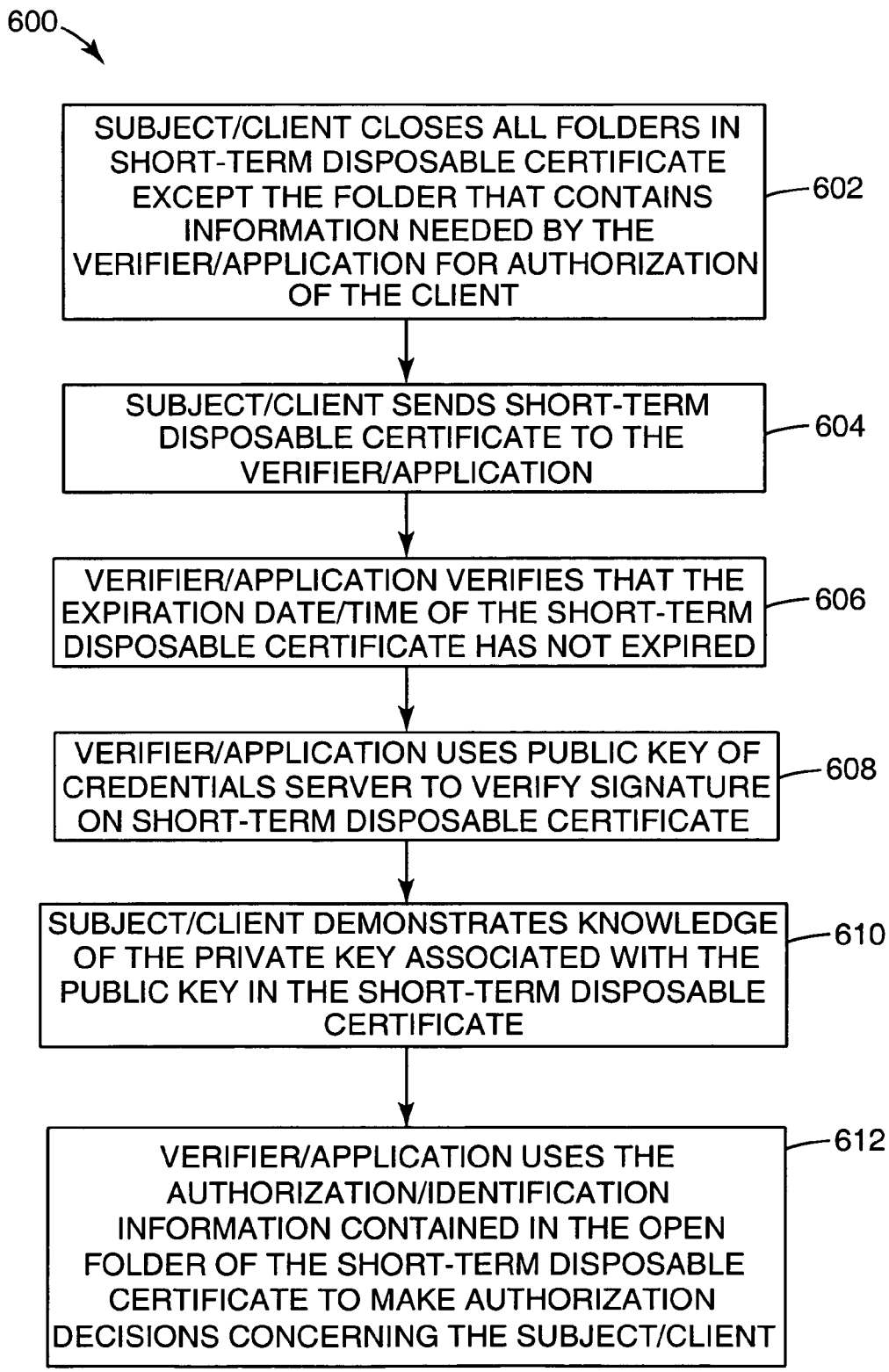
FIG. 11 is a flow diagram illustrating an on-line protocol used by a subject to demonstrate its identity to a verifier of the PKI of FIG. 8.

An on-line protocol for authorizing subject/client 34' is illustrated generally at 600 in FIG. 11. On-line protocol 600 is employed by subject/client 34' to demonstrate its identity to verifier/application 36'. On-line protocol 600 is also used by verifier/application 36' to make authorization decisions concerning subject/client 34', such as allowing/denying access or authorizing specific transactions.

At step 602, subject/client 34' closes all folders 88 in structured short-term disposable certificate 80, except the folder that contains the necessary identification/authorization information 83/89 required by verifier/application 36' to make authorization decisions concerning subject/client 34'. At step 604, subject/client 34' sends structured short-term disposable certificate 80 to verifier/application 36'.

At step 606, verifier/application 36' verifies that the expiration date/time specified in expiration field 86 of structured short-term disposable certificate 80 has not expired.

At step 608, verifier/application 36' uses a public key of credentials server 42' to verify the signature in signature field 87 of structured short-term disposable certificate 80. Verifier/application 36' knows the public key of credentials server 42' either directly or through certification by a higher certificate authority.

At step 610, subject/client 34' demonstrates knowledge of the private key 46' associated with the public key 82 of structured short-term disposable certificate 80. Step 610 is performed in a way that depends on the cryptosystem for which the private/public key pair has been generated by subject/client 34'. For example, in a digital signature cryptosystem, subject/client 34' demonstrates knowledge of the private key 46' by using private key 46' to digitally sign a quantity derived from a random quantity generated by verifier/application 36'. Verifier/application 36' then verifies this digital signature using the public key 82 of structured short-term disposable certificate 80'.

At step 612, verifier/application 36' extracts the identification/authorization information 83/89 contained in the open folder 88 of structured short-term disposable certificate 80. In step 612, verifier/application 36' then uses the identification/authorization information 83/89 to make authorization decisions concerning subject/client 34'.

On-line protocol 600 for authorizing subject/client 34' utilizes structured short-term disposable certificate 80 having one folder for each application that may be accessed by subject/client 34' as determined by a user profile. This ensures that each application only has access to authorization information that it requires. Nevertheless, the authorization performed by PKI 30' can be implemented with non-structured short-term disposable certificates, where multiple non-structured short-term disposable certificates are employed in place of one structured short-term disposable certificate 80.

The PKI 30/30' is greatly simplified and substantially more efficient than conventional PKIs. For example, applications only need to use the short-term disposable certificate for authentication and/or authorization. The unsigned certificate 60, which replaces the traditional long-term certificate, can be reserved for use by the subject when requesting a short-term disposable certificate. Since the unsigned certificate 60 is not used by applications, it does not need to be signed. Instead of signing the unsigned certificate 60, the credentials server keeps the cryptographic hash table 44, which contains the cryptographic hashes of the unsigned certificates that are currently valid. In this way, certificate revocation is performed simply by removing the cryptographic hash of the unsigned certificate from hash table 44. Therefore, unlike conventional PKIs, there is no signature required, no expiration date required, and no need for CRLs for unsigned certificate 60 of the PKI 30/30'.

PKI 30/30' requires a certificate status check somewhat like the on-line certificate status check required by OCSP. The certificate status check of PKI 30/30', however, occurs when the subject requests the short-term disposable certificate, rather than when the subject accesses the application, such as required by OCSP.

Figure 12:
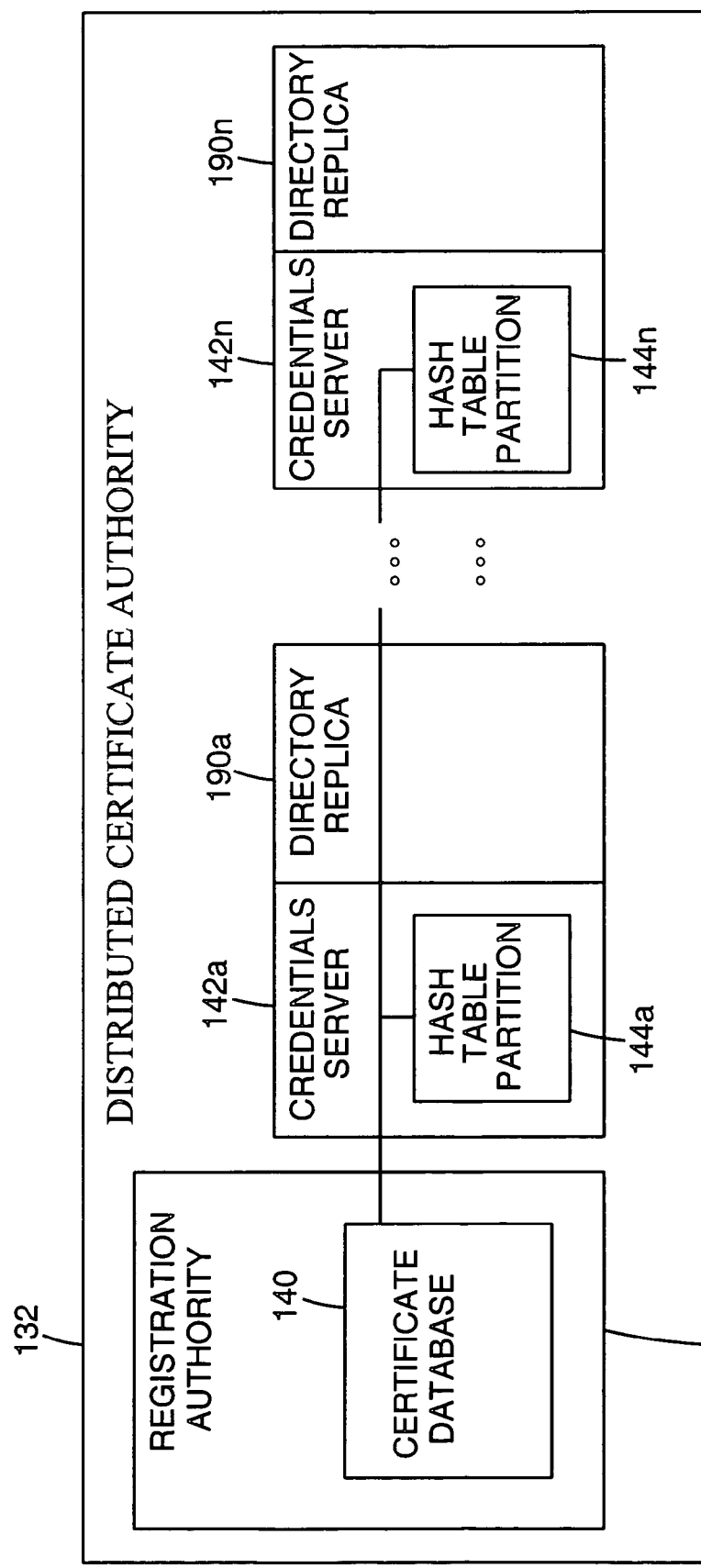
FIG. 12 is a block diagram of a distributed certificate authority having distributed credentials servers according to the present invention.

A distributed certificate authority 132 for use in PKI 30/30' is illustrated in FIG. 12. Distributed certificate authority 132 includes a registration authority 138 having a certificate database 140 which communicates with a distributed credentials server 142.

Distributed credentials server 142 includes credentials servers 142a through 142n. Each credentials server 142 includes a corresponding hash table partition 144. In one embodiment, cryptographic hash table 144 is partitioned into hash table partitions 144a through 144n according to a value of some of the bits of the cryptographic hash. In a PKI 30/30' employing distributed certificate authority 132 having distributed credentials servers 142a–142n, the subject sends a request for a short-term disposable certificate directly to the correct hash table partition 144.

Certificate authority 132 is further optimized by directly coupling each credentials server 142 with its own replica of directory 190.

The PKI 30/30' is highly scalable because many bottlenecks of conventional PKIs are removed. The unsigned certificates 60 employed by PKI 30/30' do not expire and do not have to be renewed periodically. In addition, CRLs are not used. No significant bottlenecks have been introduced with PKI 30/30'.

One potential bottleneck of PKI 30/30' is that the credentials server 42/42'/142 issues short-term disposable certificates very often, such as once a day, every few hours, or even every few minutes. This frequency of issuing short-term disposable certificates from the credentials server, however, is not a significant bottleneck, because the hash table can be partitioned, such as hash table portions 144a–144n of the distributed certificate authority 132 illustrated in FIG. 12 and the credentials server can be replicated as required, such as credentials servers 142a–142n of distributed certificate authority 132.

Another potential bottleneck with PKI 30/30' is the certificate database 40/40' of registration authority 38/38'. However, certificate database 40/40' is not a significant bottleneck, because the certificate database is only accessed when unsigned certificates 60 are issued or revoked. Certificate database 40/40' can be implemented using a relational database management system (DBMS), which can handle millions of unsigned certificates.

Another potential bottleneck with PKI 30/30' is directory 90. Directory 90 is not a significant bottleneck, because directory 90 can be replicated to make it possible to handle millions of users. In addition, LDAP traffic to directory 90 is significantly reduced, since applications do not access directory 90 to make authorizations decisions, since all necessary authorization information is contained in short-term disposable certificate 80 in the embodiment where PKI 30' is used for authorizing the subject. Therefore, PKI can scale to millions of users.

Public Key Validation Service

The present invention concerns a user of a public key cryptosystem referred to as a subject (e.g., a human or a computer system), which has a public/private key pair, and which uses the key pair to demonstrate its identity to another user of the same cryptosystem referred to as a verifier. The subject uses a public key validation service (PKVS) to validate the subject's public key before using the key pair for authentication purposes, in such a way that the public key will cease to be usable for authentication purposes if the subject notifies the PKVS that the private key has been compromised.

The PKVS has one or more public key validation agents (PKVAs). Each PKVA has a private/public key pair for a digital signature cryptosystem. The PKVA uses its private key to sign public key validation certificates (PKVCs) as described below. The reason why a PKVS may have more than one PKVA is to increase the rate at which the PKVS can issue PKVCs. Different PKVAs of the same PKVS are functionally independent. In particular, they have different signature key pairs.

The subject registers the subject's public key with a PKVA. The PKVA functions as a certification authority that issues disposable certificates similar to the above described lightweight PKI 30/30' employing disposable certificates, except that the PKVA is not concerned with the identity of the subject. Instead of binding the public key of the subject to the subject's identity, the PKVA binds the public key of the subject to a serial number generated by the PKVA and different from all previous such numbers generated by the same PKVA. This serial number is referred to herein as a public key validation number (PKVN).

The PKVA issues an unsigned certificate that binds the public key to the PKVN and sends it to the subject. This certificate is referred to herein as an unsigned public key validation certificate (unsigned PKVC). The PKVA also sends the subject a public key revocation code(PKRC). The PKRC should be sent over a secure channel that provides data confidentiality, such as an SSL connection, and should be kept secret by the subject. The PKVA later issues disposable certificates to the subject against the unsigned PKVC. A disposable certificate issued against the PKVC is referred to herein as a disposable public key validation certificate (disposable PKVC). If the subject's private key is compromised, the subject asks the PKVA to stop issuing disposable PKVCs, using the PKRC to authenticate the request.

The subject may use its private/public key pair for multiple authentication purposes, and may use a different authentication method for each purpose. Four different example authentication methods are described below and include: 1) authentication using traditional public key certificates; 2) authentication using disposable certificates as described above and in the above incorporated co-pending Patent Application entitled "LIGHTWEIGHT PUBLIC KEY INFRASTRUCTURE EMPLOYING DISPOSABLE CERTIFICATES;" 3) authentication using unsigned certificates that are presented directly to the verifiers, as described in above incorporated co-pending Patent Application entitled "LIGHTWEIGHT PUBLIC KEY INFRASTRUCTURE EMPLOYING UNSIGNED CERTIFICATES;" and 4) authentication without certificates.

The authentication using unsigned certificates method is suitable when there are only a few verifiers (e.g., up to a few hundred verifiers). The authentication without certificates method involves only one verifier. Each of these four methods can be modified to take advantage of a PKVA according to the present invention.

The authentication methods using traditional public key certificates, disposable certificates, or unsigned certificates involve certificates issued by a certificate authority. Two certificate authorities are employed when any of these authentication methods are used in conjunction with a PKVA. The two certificate authorities issue certificates for the same public key. The first certificate authority is the PKVA, which issues certificates binding the public key to a PKVN. The second certificate authority issues certificates binding the public key to the subject's identity. The second certificate authority is herein referred to as the regular certificate authority. When there may be confusion, certificates of any kind issued by the regular certificate authority are herein referred to as regular certificates.

In a traditional PKI, a certificate may have to be revoked because the attributes contained in the certificate no longer apply to the subject, or because the private key has been compromised. In either case, the same certificate authority must be notified and asked to revoke the certificate. When a PKVA is used, the PKVA is notified by the subject when the subject's private key is compromised, while the regular certificate authority is notified by an administrator when the attributes no longer apply to the subject.

Authentication with Traditional Public Key Certificates

In authentication with traditional public key certificates, a subject registers its public key and identity attributes with a traditional certificate authority. The certificate authority verifies that the attributes apply to the subject, then signs a certificate that binds the subject's public key to the attributes. The subject proves its identity to a verifier by submitting the certificate and demonstrating knowledge of the private key associated with the public key contained in the certificate.

To take advantage of a PKVA, the above authentication method using traditional public key certificates is modified as follows. When registering with the regular certificate authority, the subject submits the unsigned PKVC and the public key of the PKVA instead of simply submitting its public key. The subject also submits its identity attributes as before. The regular certificate authority computes a public key validation hash (PKVH) by applying a collision-resistant cryptographic hash function, such as MD5 or SHA-1, to the PKVN contained in the unsigned PKVC concatenated with the public key of the PKVA.

The regular certificate authority issues a traditional certificate to the subject that contains the PKVH as a critical field, in addition to the public key and attributes of the subject. Later, the subject submits the traditional certificate to the verifier and demonstrates knowledge of the private key associated with the public key contained in the certificate. The subject also submits a disposable PKVC obtained from the PKVA and the public key of the PKVA to the verifier.

The verifier verifies the traditional certificate issued by the regular certificate authority in the usual way. The verifier verifies that the disposable PKVC has not expired, and verifies the signature of the PKVA on the disposable PKVC using the public key of the PKVA. The verifier computes the PKVH from the PKVN contained in the disposable PKVC and the public key of the PKVA, and checks that it coincides with the PKVH contained in the traditional certificate.

If the private key is compromised, the subject notifies the PKVA, which revokes the unsigned PKVC. After the PKVA revokes the unsigned PKVC, the PKVA will no longer issue disposable PKVCs binding the public key of the subject to the same PKVN. Therefore, an attacker with knowledge of the subject's private key will not be able to masquerade as the subject using the traditional certificate issued by the certificate authority. The attacker can register the subject's public key with the same PKVA or with a different PKVA, and obtain a disposable PKVC for the public key. The attacker can then submit the traditional certificate, the disposable PKVC, and the public key of the PKVA that the attacker has used. However, the PKVH computed by the verifier will not match the PKVH computed by the regular certificate authority and contained in the traditional certificate. Indeed, if the attacker has used a different PKVA, the public key of the PKVA used in the hash computation will be different. If the attacker has used the same PKVA, the PKVA will have generated a different PKVN, and thus the PKVN used in the hash computation will be different. Since the hash computation uses a collision-resistant hash function, if either the public key of the PKVA or the PKVN changes, the result of the hash computation will have a very high probability of being different.

Figure 13:
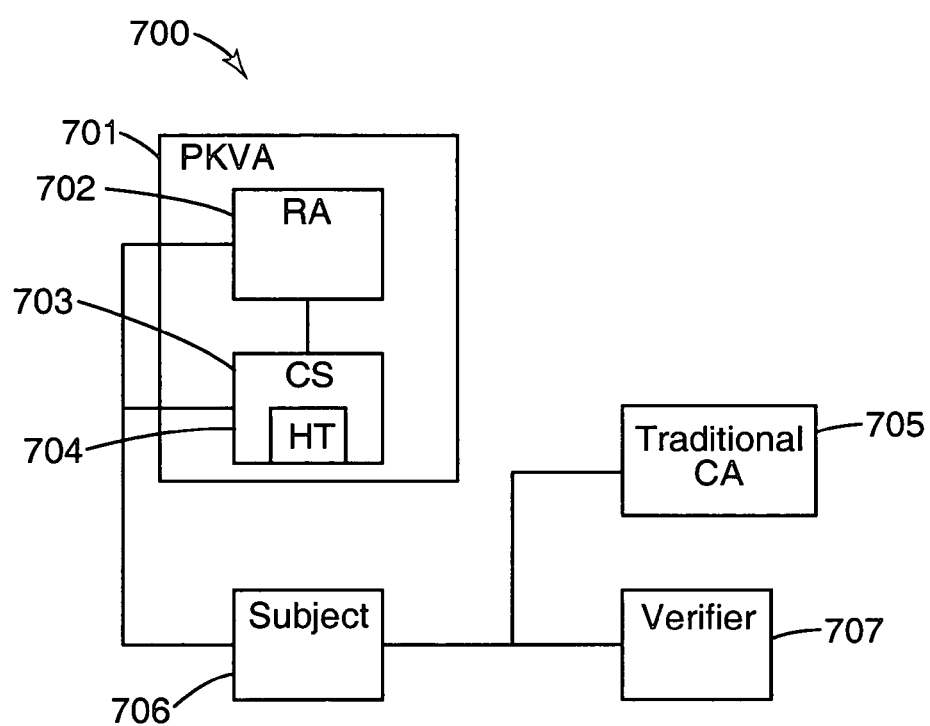
FIG. 13 is a block diagram of a PKI having a public key validation service (PKVS) and employing authentication with traditional public key certificates.

A PKI according to the present invention which combines the use of a PKVS with the use of traditional certificates is illustrated generally at 700 in FIG. 13. PKI 700 includes several main components which are each a software program. The main software program components of PKI 700 run on one or more computer systems. In one embodiment, each of the main software program components runs on its own computer system.

The PKVS of PKI 700 comprises one or more PKVAs 701 having the functionality of a certificate authority that can issue disposable certificates similar to the certificate authority 32/32' of the above described lightweight PKI 30/30' employing disposable certificates. As such, PKVA 701 includes a registration authority (RA) 702 that maintains a certificate database containing unsigned certificates. PKVA 701 also includes a credentials server (CS) 703 that maintains a hash table (HT) 704 containing cryptographic hashes of unsigned certificates.

Registration authority 702 is an off-line component of PKVA 701 and is responsible for subject registration, maintaining its certificate database, and issuing unsigned certificates.

Credentials server 703 is an on-line component of PKVA 701 and is responsible for issuing the disposable certificates and for maintaining the list of cryptographic hashes of currently valid unsigned certificates in hash table 704. Each cryptographic hash in hash table 704 is computed from an unsigned certificate using an agreed upon collision-resistant hash function, such as SHA-1 or MD5. Hash table 704 is essentially a list of the currently valid unsigned certificates which is keyed by the cryptographic hash. Cryptographic hashes function well as keys for hash table 704, because cryptographic hashes behave statistically as random quantities.

PKVA 701 has private/public key pair for a digital signature cryptosystem.

PVKS 700 also comprises a traditional certificate authority (CA) 705 with the capability of issuing revocable public key certificates and certificate revocation lists, as well as one or more subjects 706 and one or more verifiers 707. Each subject 706 is equipped with a private/public key pair for a cryptosystem of any kind. The certificate authority 705 is equipped with a private/public key pair for a digital signature cryptosystem. The public key of certificate authority 705 is well known by the verifiers or is certified by a higher authority.

Subject 706 employs the following Protocol P1 to register its public key with PKVA 701.

Protocol P1

Figure 14:
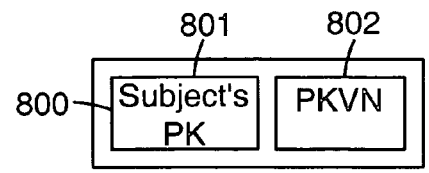
FIG. 14 is a diagram of an unsigned public key validation certificate.

1. Subject 706 sends its public key to registration authority 702.
2. Registration authority 702 generates a public key validation number (PKVN), different from all PKVNs previously generated by PKVA 701.
3. Registration authority 702 creates an unsigned public key validation certificate (unsigned PKVC) 800. Unsigned PKVC 800 is illustrated in FIG. 14 and comprises a field 801 containing the public key of subject 706 and a field 802 containing the PKVN generated in step 2 of Protocol P1. Registration authority 702 sends the unsigned PKVC 800 to subject 706.
4. Registration authority 702 generates a secret quantity to be used by subject 706 as a public key revocation code (PKRC) and sends it to subject 706 over a secure channel that provides data confidentiality.
5. Registration authority 702 computes a cryptographic hash of the unsigned certificate 800 using a collision-resistant hash function, such as MD5 or SHA-1.
6. Registration authority 702 sends the cryptographic hash computed in step 5 of Protocol P1 and the PKRC generated in step 4 of Protocol P1 to credentials server 703.
7. Credentials server 703 creates a record in its hash table 704 containing the cryptographic hash and PKRC sent by registration authority 702 in step 6 of Protocol P1. The record is keyed by the cryptographic hash.

Subject 706 employs the following protocol P2 to obtain a disposable public key validation certificate (disposable PKVC).

Protocol P2

Figure 15:
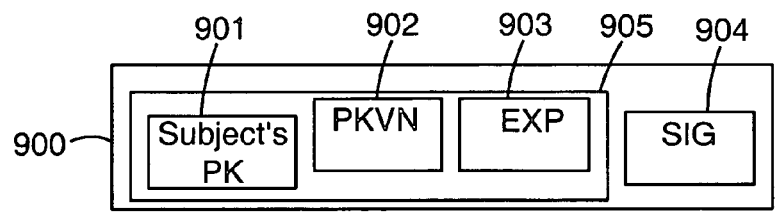
FIG. 15 is a diagram of a disposable public key validation certificate.

1. Subject 706 sends a message to credentials server 703 containing the unsigned PKVC 800 and requesting that a disposable PKVC be issued against the unsigned PKVC 800.
2. Credentials server 703 computes the cryptographic hash of the unsigned PKVC 800 by the same collision-resistant hash function that was used in step 5 of Protocol P1, and verifies that there is a record for that cryptographic hash in the hash table 704.
3. Credentials server 103 creates a disposable PKVC 900. Disposable PKVC 900 is illustrated in FIG. 15 and comprises: a field 901 with same contents as the field 801 of the unsigned PKVC 800; a field 902 with same contents as the field 802 of the unsigned PKVC 800; a field 903 containing an expiration date and time that specify a short validity period for the disposable PKVC 900; and a signature field 904. The duration of the validity period may be specified by subject 706. The signature contained in field 904 is computed by credentials server 703 using the private key of PKVA 701, on a sequence 905 of non-signature fields, such as fields 901, 902, and 903. Credentials server 703 sends the PKVC 900 to subject 706.

If its private key is compromised, subject 706 employs the following Protocol P3 to prevent impersonation by an attacker.

Protocol P3

1. Subject 706 sends a public key revocation request to credentials server 703 containing the unsigned PKVC 800 sent by registration authority 702 in step 3 of Protocol P1 and the PKRC sent by registration authority 702 in step 4 of Protocol P1.
2. Credentials server 703 computes the cryptographic hash of the unsigned PKVC 800 using the same collision-resistant hash function that was used by registration authority 702 in step 5 of Protocol P1.
3. Credentials server 703 looks up its hash table 704, finds the record keyed by the cryptographic hash computed in step 2 of Protocol P3, and checks that the PKRC field of that record coincides with the PKRC sent by subject 706 in step 1 of Protocol P3. If this is the case, credentials server 703 removes the record from its hash table 704.

Subject 706 employs the following Protocol P4 to register with traditional certificate authority 705.

Protocol P4

Figure 16:
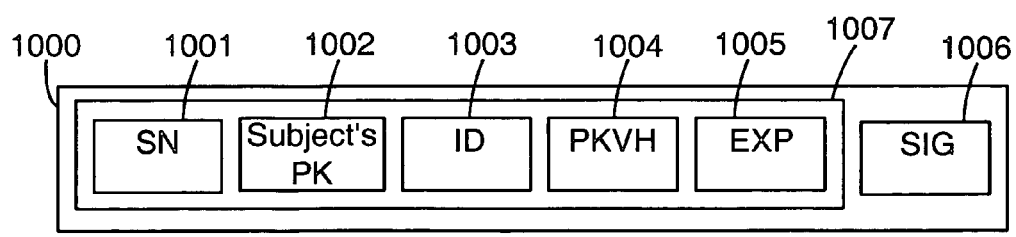
FIG. 16 is a diagram of a revocable certificate.

1. Subject 706 sends the following data to traditional certificate authority 705: the unsigned PKVC 800; the public key of PKVA 701; and one or more identity attributes.
2. Certificate authority 705 verifies, by out-of-band administrative means, that the one or more identity attributes sent by subject 706 in step 1 of Protocol P4 apply to the subject.
3. Certificate authority 705 computes a public key validation hash (PKVH) by applying a collision-resistant hash function, such as MD5 or SHA-1, to the concatenation of the PKVN contained in field 802 of the unsigned PKVC 800, and the public key of PKVA 701.
4. Certificate authority 705 creates and signs a revocable certificate 1000 and sends the revocable certificate to subject 706. Revocable certificate 1000 is illustrated in FIG. 16 and comprises: a field 1001 containing a serial number; an optional field 1002 containing the subject's public key (obtained from field 801 of the unsigned PKVC 800); a field 1003 containing the one or more identity attributes sent in step 1 of Protocol P4; a field 1004 containing the PKVH computed in step 3 of Protocol P4; and a field 1005 containing an expiration date/time. In one embodiment, if the X.509v3 format is used, the field 1004 is flagged as being critical, to ensure that it will not be ignored by a older verifier that does not understand the purpose of this field. The revocable certificate 1000 also includes a signature field 1006 containing a digital signature computed over a sequence of non-signature fields 1007, such as fields 1001, 1002, 1003, 1004, and 1005, using the private key of certificate authority 705. The field 1002 is optional because the revocable certificate 1000 is used in conjunction with a disposable PKVC 900 that contains the subject's public key and the PKVH 1004 is associated with the subject's public key.

The following Protocol P5 is employed by subject 706 to prove its identity to verifier 707.

Protocol P5

1. Subject 706 sends the following data to verifier 707: the revocable certificate 1000; a recently issued disposable PKVC 900; and the public key of PKVA 701.
2. Verifier 707 validates the revocable certificate 1000. Verifier 707 uses field 1005 to verify that the certificate 1000 has not expired. Verifier 707 verifies the signature 1006 using the public key of certificate authority 705. Verifier 707 verifies that the serial number 1001 does not appear in the latest certificate revocation list issued by certificate authority 705.
3. Verifier 707 validates the disposable PKVC 900. Verifier 707 uses field 903 to verify that the disposable PKVC 900 has not expired. Verifier 707 verifies the signature 904 using the public key of PKVA 701 sent by subject 706 in step 1 of Protocol P5.
4. The verifier 707 computes a PKVH by applying the same collision-resistant hash function used by certificate authority 705 in step 3 of Protocol P4 to the concatenation of the PKVN in field 902 contained in the disposable PKVC 900 sent by subject 706 in step 1 of Protocol P5, and the public key of PKVA 701 also sent by subject 706 in step 1 of Protocol P5. Verifier 707 checks that the computed PKVH coincides with field 1004 of the revocable certificate 1000 sent by subject 706 in step 1 of Protocol P5.
5. Subject 706 demonstrates knowledge of the private key associated with the public key contained in field 901 of the disposable PKVC 900 sent in step 1 of Protocol P5. The method in which subject 706 demonstrates knowledge the private key depends on the cryptosystem for which the subject's private/public key pair has been generated. For example, if that cryptosystem is a digital signature cryptosystem, subject 706 can demonstrate knowledge of the private key by using the private key to sign a quantity derived from a random quantity generated by verifier 707. Verifier 707 can then verify the signature using the public key 901.

Authentication with Disposable Certificates

In authentication with disposable certificates as described above for Lightweight PKI 30/30' Employing Disposable Certificates, the certificate authority has an off-line component, the registration authority and an on-line component, the credentials server. The subject registers its public key and identity attributes with the registration authority. The registration authority issues an unsigned certificate to the subject, which binds the public key to the attributes, and sends the cryptographic hash of the unsigned certificate to the credentials server, which stores the cryptographic hash in a hash table. Later, the subject submits the unsigned certificate to the credentials server and obtains a disposable certificate as long as the hash of the unsigned certificate is still in the hash table. Finally, the subject uses the disposable certificate, as well as knowledge of its private key, to demonstrate its identity to a verifier.

To take advantage of a PKVA, the above authentication method using disposable certificates is modified as follows. When registering with the registration authority of the regular certificate authority, the subject submits the unsigned PKVC and the public key of the PKVA instead of simply submitting its public key. The subject also submits its identity attributes as before. The registration authority issues a regular unsigned certificate to the subject for binding the subject's public key to the attributes. The registration authority sends to the credentials server a cryptographic hash computed by applying a collision-resistant hash function, such as MD5 and SHA-1, to the concatenation of the regular unsigned certificate with the PKVN and the public key of the PKVA. The credentials server adds the cryptographic hash to its hash table as before.

Later the subject submits the regular unsigned certificate to the credentials server of the regular certificate authority, together with a disposable PKVC and the public key of the PKVA. The credentials server uses the public key of the PKVA to verify the signature on the disposable PKVC. If the regular unsigned certificate includes an optional filed containing the subject's public key, the credentials server checks that the public key appearing in the regular unsigned certificate is the same public key that appears in the disposable PKVC. The credentials server computes a cryptographic hash by applying the same collision-resistant hash function to the concatenation of the regular unsigned certificate, the PKVN contained in the PKVC, and the public key of the PKVA, and checks that the cryptographic hash appears in its hash table. If the computed cryptographic hash appears in the credentials server's hash table, the credentials server issues to the subject a regular disposable certificate that binds the public key of the subject to the identity attributes. The disposable PKVC must still be valid, and the expiration date/time of the regular disposable certificate is set so that it will expire no later than the disposable PKVC. As in the above unmodified authentication method using disposable certificates, the subject uses the regular disposable certificate, as well as knowledge of its private key, to demonstrate its identity to a verifier.

Notice that the verifier need not be modified to take advantage of the PKVA. The subject submits to the verifier only the regular disposable certificate issued by the credentials server, not the disposable PKVC. The disposable PKVC is submitted only to the credentials server.

If the private key is compromised, the subject notifies the PKVA, which revokes the unsigned PKVC. After the PKVA revokes the unsigned PKVC, the PKVA will no longer issue disposable PKVCs binding the public key of the subject to the same PKVN. Therefore, an attacker cannot obtain regular disposable certificates from the credentials server based on the previously-issued regular unsigned certificate. The attacker can register the subject's public key with the same PKVA or with a different PKVA and obtain a disposable PKVC for the public key. The attacker can then submit the subject's regular unsigned certificate, the disposable PKVC, and the public key of the PKVA, to the credentials server. However, the hash computed by the credentials server will not match the hash that was sent by the registration authority to the credentials server when the subject registered with the registration authority. Indeed, if the attacker has used a different PKVA, the public key of the PKVA used in the hash computation will be different. If the attacker has used the same PKVA, the PKVA will have generated a different PKVN, and thus the PKVN used in the hash computation will be different. Since the hash computation uses a collision-resistant hash function, if either the public key of the PKVA or the PKVN changes, the result of the computation will have a very high probability of being different.

Figure 17:
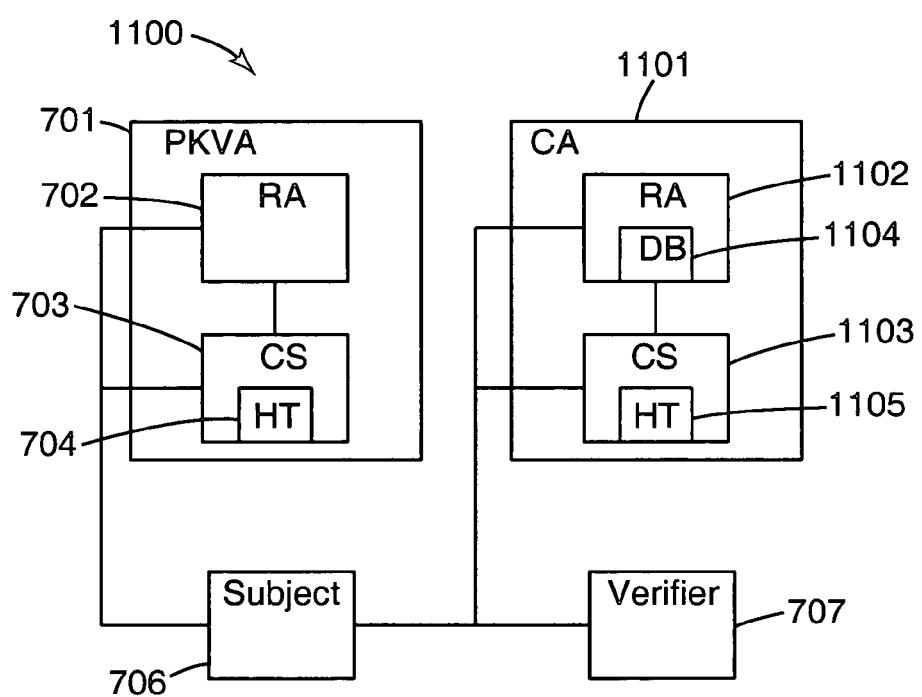
FIG. 17 is a block diagram of a PKI having a PKVS and employing authentication with disposable certificates.

A PKI according to the present invention which combines the use of a PKVS with the use of regular disposable certificates is illustrated generally at 1100 in FIG. 17. PKI 1100 includes several main components which are each a software program. The main software program components of PKI 1100 run on one or more computer systems. In one embodiment, each of the main software program components runs on its own computer system.

The PKI 1100 of FIG. 17 differs from the PKI 700 illustrated in FIG. 13, in that instead of having the regular certificate authority 705 of PKI 700 that issues revocable certificates and certificate revocation lists, PKI 1100 includes a regular certificate authority 1101 that issues disposable certificates. Certificate authority 1101 comprises an off-line component 1102, which functions as a registration authority (RA), and an on-line component 1103 which functions as a credentials server (CS). Registration authority 1102 maintains a database 1104 while credentials server 1103 maintains a hash table 1105.

Subject 706 employs the above Protocol P1 to register its public key with the PKVA 701 and obtain an unsigned PKVC 800.

Subject 706 employs the above Protocol P2 to obtain a disposable PKVC 900.

If the subject's private key is compromised, subject 706 employs above Protocol P3 to prevent impersonation by an attacker.

Subject 706 employs the following Protocol P6 to register with the regular certificate authority 1101 and obtain a regular unsigned certificate.

Protocol P6

Figure 18:
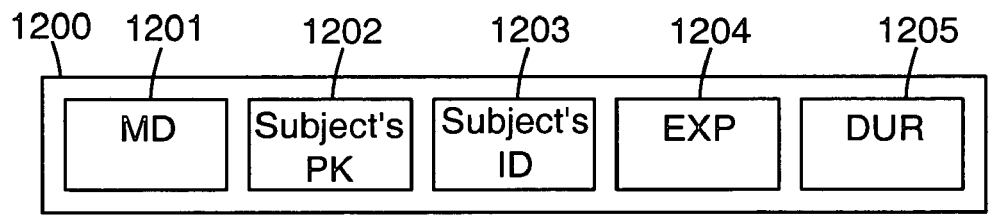
FIG. 18 is a diagram of a regular unsigned certificate.

1. Subject 706 sends the following data to registration authority 1102: the unsigned PKVC 800; the public key of the PKVA; and one or more identity attributes.
2. Registration authority 1102 verifies, by out-of-band administrative means, that the one or more identity attributes sent by subject 706 in step 1 of Protocol P6 apply to subject 706.
3. Registration authority 1102 creates a regular unsigned certificate 1200, stores unsigned certificates 1200 in its database 1104, and sends unsigned certificate 1200 to subject 706. The regular unsigned certificate 1200 is illustrated in FIG. 18 and comprises the following fields: one or more fields 1201 containing metadata, such as serial number and issuer name; an optional field 1202 containing the public key of the subject 706; one or more fields 1203 containing the one or more identity attributes sent by the subject 706 in step 1 of Protocol 6; an optional field 1204 specifying an expiration date/time; and an optional field 1205 specifying a duration for the validity period of any disposable certificates issued against the unsigned certificate 1200.
4. Registration authority 1102 creates a cryptographic hash by applying a collision-resistant hash function, such as MD5 or SHA-1, to the concatenation of the regular unsigned certificate 1200, the PKVN field 802 contained in the PKVC 800 sent in step 1 of Protocol P6, and the public key of the PKVA also sent in step 1 of Protocol P6. Registration authority 1102 sends this cryptographic hash to credentials server 1103.
5. Credentials server 1103 stores the cryptographic hash sent by registration authority 1102 in step 4 of Protocol 6 in its hash table 1105.

Subject 706 employs the following Protocol P7 to obtain a regular disposable certificate from credentials server 1103.

Protocol P7

1. Subject 706 sends the following data to credentials server 1103: the regular unsigned certificate 1200 obtained from the registration authority 1102 using Protocol P6; a disposable PKVC 900 recently obtained from the PKVA 701 using Protocol P2; and the public key of the PKVA 701.

2. Credentials server 1103 validates the disposable PKVC 900 sent in step 1 of Protocol P7. Credentials server 1103 uses field 903 to verify that the certificate 900 has not expired. Credentials server 1103 verifies the signature 904 using the public key of PKVA 701 also sent in step 1 of Protocol P7.

3. Credentials server 1103 computes a cryptographic hash by applying the same collision-resistant hash function used by registration authority 1102 in step 4 of Protocol P6 to the concatenation of the regular unsigned certificate 1200 sent by subject 706 in step 1 of Protocol P7, the PKVN 902 contained in the PKVC 900 sent by subject 706 in step 1 of Protocol P7, and the public key of PKVA 701 also sent by subject 706 in step 1 of Protocol P7.

4. Credentials server 1103 verifies that the cryptographic hash computed in step 3 of Protocol P7 is present in its hash table 1105.

Figure 19:
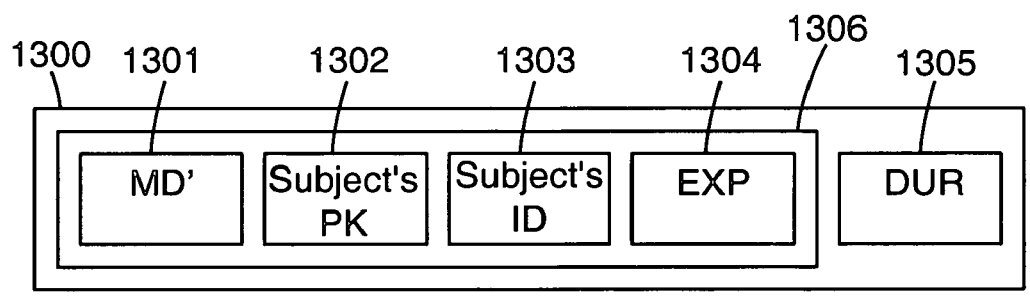
FIG. 19 is a diagram of a regular disposable certificate.

5. Credentials server 1103 creates, signs, and sends to subject 706 a regular disposable certificate 1300. Regular disposable certificate 1300 is illustrated in FIG. 19 and comprises the following fields: one or more fields 1301 containing metadata, such as serial number and issuer name; a field 1302 containing the public key of the subject 706, identical to the field 901 of the disposable PKVC 900 sent by subject 706 in step 1 of Protocol P7; one or more fields 1303 identical to the one or more subject identity attributes 1203 of the regular unsigned certificate 1200; a field 1304 specifying an expiration date/time for the regular disposable certificate 1300; and one or more fields 1305 containing the signature of credentials server 1103 on a sequence of non-signature fields 1306. The expiration date/time specified by field 1304 must be no later than the expiration date/time specified by field 903 of the disposable PKVC 900 sent by subject 706 in step 1 of Protocol P7. If the regular unsigned certificate 1200 sent by subject 706 in step 1 of Protocol P7 contains the optional field 1205 specifying a duration for the validity interval of disposable certificates, the expiration date/time specified by field 1304 must also be no later than the end of an interval of such duration that starts when the disposable certificate 1300 is created.

Subject 706 uses the regular disposable certificate 1300 in conjunction with its private key to prove its identity to a verifier 707. This is accomplished as in the unmodified protocol for authentication by disposable certificates as described above for employing lightweight PKI 30/30' disposable certificates.

Authentication with Unsigned Certificates

In authentication with unsigned certificates as described in above incorporated co-pending Patent Application entitled "LIGHTWEIGHT PUBLIC KEY INFRASTRUCTURE EMPLOYING UNSIGNED CERTIFICATES," the subject registers its public key and identity attributes with the certificate authority. The certificate authority issues an unsigned certificate to the subject, which binds the public key to the attributes, and sends the cryptographic hash of the unsigned certificate to each verifier, which stores the cryptographic hash in its hash table. Later, the subject submits the unsigned certificate to a verifier and demonstrates knowledge of the private key associated with the public key contained in the certificate. The verifier computes the cryptographic hash of the unsigned certificate and checks that the computed cryptographic hash appears in its hash table.

To take advantage of a PKVA, the above authentication method using unsigned certificates is modified as follows. When registering with the regular certificate authority, the subject submits the unsigned PKVC and the public key of the PKVA instead of simply submitting its public key. The subject also submits its identity attributes as in the unmodified method. The regular certificate authority issues to the subject a regular unsigned certificate that binds the pubic key to the attributes. The certificate authority sends to each verifier a cryptographic hash computed by applying a collision-resistant hash function such as MD5 and SHA-1, to the concatenation of the regular unsigned certificate with the PKVN and the public key of the PKVA. Each verifier adds the cryptographic hash to its hash table as in the unmodified method.

Later the subject submits the regular unsigned certificate to a verifier, together with a disposable PKVC and the public key of the PKVA. The verifier checks that the disposable PKVC has not expired and uses the public key of the PKVA to verify the signature on the disposable PKVC. If the regular unsigned certificate includes an optional field containing the subject's public key, the verifier checks that the public key appearing in the regular unsigned certificate is the same public key that appears in the disposable PKVC, and the subject demonstrates knowledge of the private key associated with that public key. The verifier computes a cryptographic hash by applying the same collision-resistant hash function to the concatenation of the unsigned certificate, the PKVN contained in the PKVC, and the public key of the PKVA, and checks that the cryptographic hash appears in its hash table.

If the private key is compromised, the subject notifies the PKVA, which revokes the unsigned PKVC. After the PKVA revokes the unsigned PKVC, the PKVA will no longer issue disposable PKVCs binding the public key of the subject to the same PKVN. Therefore, an attacker cannot masquerade as the subject when interacting with a verifier. The attacker can register the subject's public key with the same or with a different PKVA and obtain a disposable PKVC for the public key. The attacker can then submit the subject's regular unsigned certificate, the disposable PKVC, and the public key of the PKVA to a verifier. However, the hash computed by the verifier will not match the hash that was sent by the certificate authority to the verifier when the subject registered with the certificate authority. Indeed, if the attacker has used a different PKVA, the public key of the PKVA used in the hash computation will be different. If the attacker has used the same PKVA, the PKVA will have generated a different PKVN, and thus the PKVN used in the hash computation will be different. Since the hash computation uses a collision-resistant hash function, if either the public key of the PKVA or the PKVN changes, the result will have a very high probability of being different.

Figure 20:
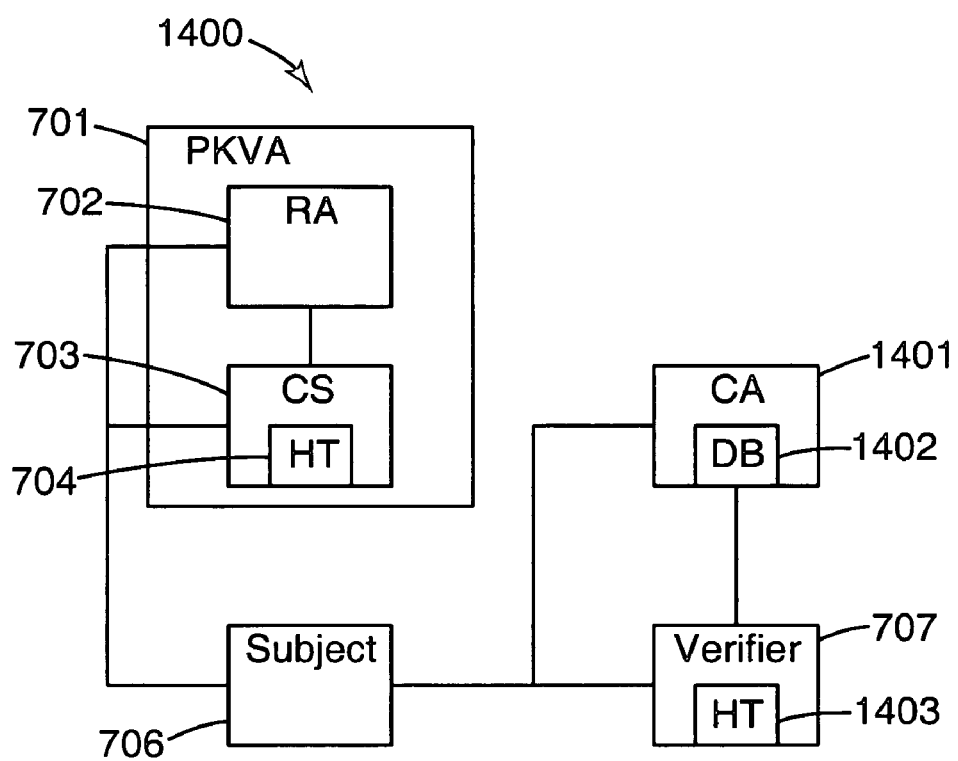
FIG. 20 is a block diagram of a PKI having a PKVS and employing authentication with unsigned certificates.

A PKI according to the present invention which combines the use of a PKVS with the use of regular unsigned certificates that are submitted directly to verifiers is illustrated generally at 1400 in FIG. 20. PKI 1400 includes several main components which are each a software program. The main software program components of PKI 1400 run on one or more computer systems. In one embodiment, each of the main software program components runs on its own computer system.

The PKI 1400 differs from PKI 700 and PKI 1100 in that the regular certificate authority that certifies the subject's identity is implemented in PKI 1400 as a regular certificate authority 1401 that issues unsigned certificates for direct use by verifiers. Regular certificate authority 1401 maintains a database 1402. Also, each verifier 707 in PKI 1400 is connected to certificate authority 1401 from which each verifier 707 receives cryptographic hashes that each verifier 707 stores in a hash table 1403.

Subject 706 employs the above Protocol P1 to register its public key with PKVA 701 and obtain an unsigned PKVC 800.

Subject 106 employs the above protocol P2 to obtain a disposable PKVC 900.

If the subject's private key is compromised, subject 706 employs the above Protocol P3 to prevent impersonation by an attacker.

Subject 706 employs the following Protocol P8 to register with certificate authority 1401 and obtain an unsigned certificate.

Figure 21:
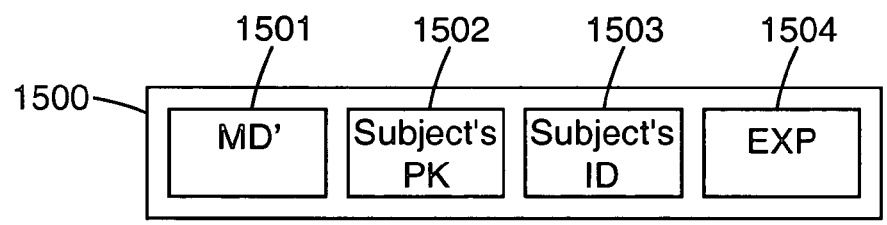
FIG. 21 is a diagram of a regular unsigned certificate.

Protocol P8
1. Subject 706 sends the following data to certificate authority 1401: the unsigned PKVC 800; the public key of the PKVA 701; and one or more identity attributes.
2. Certificate authority 1401 verifies, by out-of-band administrative means, that the one or more identity attributes sent by subject 706 in step 1 of Protocol P8 apply to subject 706.
3. Certificate authority 1401 creates a regular unsigned certificate 1500, stores the regular unsigned certificate 1500 it in its database 1402, and sends the regular unsigned certificate 1500 to subject 706. Regular unsigned certificate 1500 is illustrated in FIG. 21 and comprises the following fields: one or more fields 1501 containing metadata, such as serial number and issuer name; an optional field 1502 containing the public key of the subject 706; one or more fields 1503 containing the one or more identity attributes sent by subject 706 in step 1 of Protocol P8; and an optional field 1504 specifying an expiration date/time.
4. Certificate authority 1401 creates a cryptographic hash by applying a collision-resistant hash function, such as MD5 or SHA-1, to the concatenation of the regular unsigned certificate 1500, the PKVN 802 contained in the PKVC 800 sent in step 1 of Protocol P8, and the public key of the PKVA 701 also sent in step 1 of Protocol P8. Certificate authority 1401 sends this cryptographic hash to each verifier 707.
5. Each verifier 707 adds the cryptographic hash sent by certificate authority 1401 in step 4 of Protocol P8 to its hash table 1403.

Subject 706 employs the following Protocol P9 to prove its identity to a verifier 707.

Protocol P9
1. Subject 706 sends the following data to verifier 707: the regular unsigned certificate 1500 obtained from the certificate authority 1401 using Protocol P8; a disposable PKVC 900 recently obtained from the PKVA 701 using Protocol P2; and the public key of the PKVA 701.
2. Verifier 707 validates the disposable PKVC 900 sent in step 1 of Protocol P9. Verifier 707 uses field 903 to verify that the certificate 900 has not expired. Verifier 707 verifies the signature 904 using the public key of PKVA 701 also sent in step 1 of Protocol P9.
3. Verifier 707 computes a cryptographic hash by applying the same collision-resistant hash function used by the certificate authority 1401 in step 4 of Protocol P8 to the concatenation of the regular unsigned certificate 1500 sent by the subject in step 1 of Protocol P9, the PKVN 902 contained in the PKVC 900 sent by the subject in step 1 of Protocol P9, and the public key of PKVA 701 also sent by the subject in step 1 of Protocol P9.
4. Verifier 707 verifies that the cryptographic hash computed in step 3 of Protocol P9 is present in its hash table 1403.
5. Subject 706 demonstrates knowledge of the private key associated with the public key contained in field 901 of the disposable PKVC 900 sent in step 1 of Protocol P9. The method in which subject 706 demonstrates knowledge of the private key depends on the cryptosystem for which the subject's private/public key pair has been generated. For example, if that cryptosystem is a digital signature cryptosystem, subject 706 can demonstrate knowledge of the private key by using the private key to sign a quantity derived from a random quantity generated by the verifier 707. Verifier 707 then verifies the signature using the public key 901 contained in the PKVC 900.

Authentication without Certificates

When there is only one verifier, there is no need to use regular certificates for authentication. The subject can register its public key and identity attributes directly with the verifier. The verifier verifies that the attributes apply to the subject by an out-of-band administrative method, and records the binding of the public key to the identity attributes. Later, on a repeat visit, the subject proves its identity simply by demonstrating knowledge of the private key associated with the public key recorded by the verifier.

To take advantage of a PKVA, the above authentication method without certificates is modified as follows. When registering with the verifier, the subject submits the unsigned PKVC and the public key of the PKVA instead of simply submitting its public key. The subject also submits its identity attributes as in the unmodified method. The verifier computes a cryptographic hash by applying a collision-resistant hash function, such as MD5 and SHA-1, to the public key of the subject, the PKVN, and the public key of the PKVA. The verifier records the identity attributes and the cryptographic hash. A hash table keyed by the cryptographic hash can be used to find the record efficiently given the cryptographic hash.

On a repeat visit, the subject submits a disposable PKVC together with the public key of the PKVA, and demonstrates knowledge of the private key associated with the public key contained in the disposable PKVC. The verifier checks that the disposable PKVC has not expired and verifies the signature on the disposable PKVC using the public key of the PKVA. The verifier extracts the PKVN from the disposable PKVC, and computes a cryptographic hash by applying the same collision-resistant hash function to the public key of the subject, the PKVN, and the public key of the PKVA. The verifier uses this hash to retrieve the record containing the identity attributes of the subject.

Authentication without Certificates in an Ecommerce Scenario

Authentication without regular certificates is useful in the scenario where an ecommerce customer using a web browser accesses an ecommerce web site. In the ecommerce scenario, it is desirable to be able to use the SSL protocol, which protects communications between web browsers and web servers, without modification. This can be accomplished by a small variation of the above modified protocol for authentication without regular certificates.

In this scenario the subject is the customer using the web browser, and the verifier is the web server of the ecommerce site.

Before registering with the verifier, the subject obtains a disposable PKVC from the PKVA. To register with the verifier, the subject submits a chain of certificates, comprising: the just-obtained disposable PKVC, signed by the PKVA; and a self-signed certificate containing the public key of the PKVA. The signatures on these two certificates are not functionally necessary, but they are practically necessary so that the implementation of the SSL protocol at the ecommerce site will accept the certificate chain. The SSL implementation also checks that the disposable PKVC has not expired.

Similarly, on a repeat visit, the subject again submits a certificate chain comprising a currently valid disposable PKVC and a self-signed certificate containing the public key of the PKVA.

Figure 22:
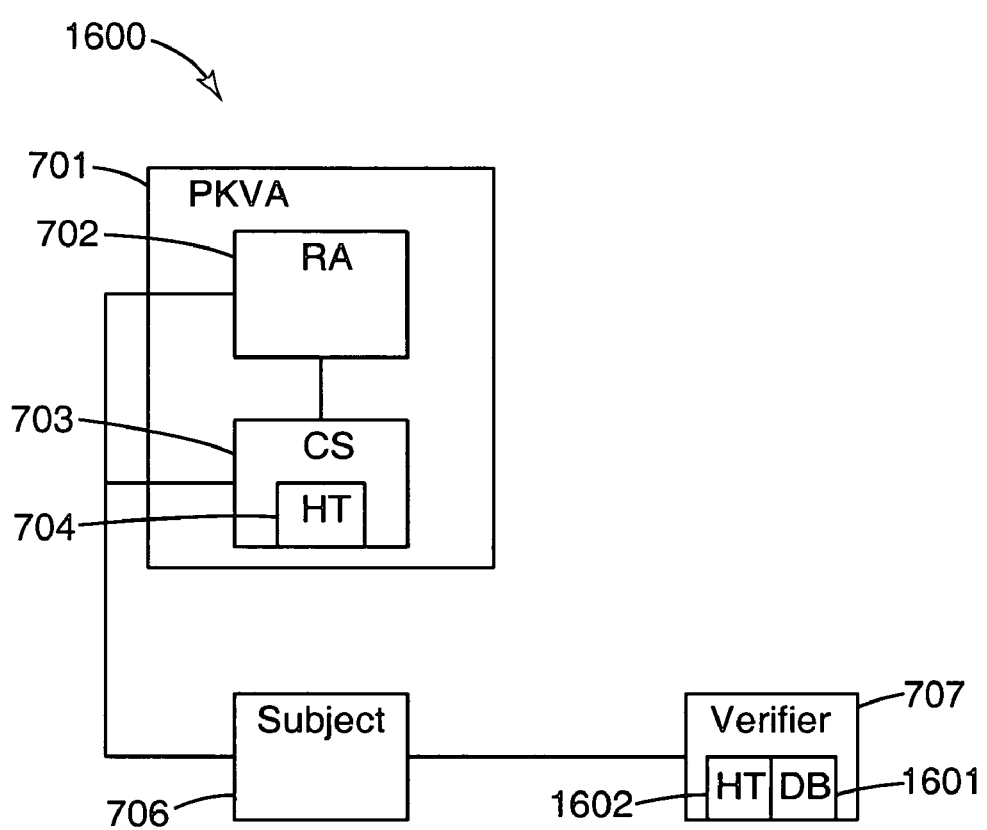
FIG. 22 is a block diagram of a PKI having a PKVS and employing authentication without certificates, such as in an ecommerce scenario.

A PKI according to the present invention having a PKVS employed in an ecommerce scenario where there is only one verifier is illustrated generally at 1600 in FIG. 22. PKI 1600 includes several main components which are each a software program. The main software program components of PKI 1600 run on one or more computer systems. In one embodiment, each of the main software program components runs on its own computer system.

The PKVS of PKI 1600 employs one or more PKVAs 701 similar to the PKVAs 701 employed by the PKVSs of PKIs 700, 1100, and 1400. PKI 1600 does not, however, employ a regular certificate authority.

In PKI 1600, subject 706 is an ecommerce customer that uses a web browser, while verifier 707 is an ecommerce site that uses a web server. Subject 706 and verifier 707 use the SSL protocol for mutual authentication and for protection of sensitive communications. The protocols used in this embodiment are designed in such a way that the SSL protocol can be used without modification between the subject 706 and the verifier 707.

In PKI 1600, verifier 707 has a database 1601 of customer records that can be accessed efficiently through a hash table 1602. Each entry in the hash table 1602 is keyed by a cryptographic hash as described below, and contains a pointer to a customer record in the database 1601.

In PKI 1600, subject 706 employs the above Protocol P1 to register its public key with the PKVA 701 and obtain an unsigned PKVC 800.

Subject 706 employs the above protocol P2 to obtain a disposable PKVC 900.

If the subject's private key is compromised, subject 706 uses the above Protocol P3 to prevent impersonation by an attacker.

Subject 706 employs the following Protocol P10 to register directly with verifier 707.

Protocol P10
1. Subject 706 and verifier 707 establish an SSL connection. As part of the SSL handshake that sets up the SSL connection, subject 706 sends to verifier 707 a client certificate chain comprising a currently valid disposable PKVC 300 and a self-signed certificate containing the public key of the PKVA 701. Also, as part of the SSL handshake, subject 706 demonstrates knowledge of the private key associated with the public key 901 contained in the PKVC 900. Verifier 707 also authenticates itself, in the usual manner, as part of the SSL handshake.
2. Subject 706 sends customer information such as name, address, credit card numbers, etc., to verifier 707 under the protection of the SSL connection established in step 1 of Protocol P10.
3. Verifier 707 carries out any out-of-band verification of the data sent by subject 706 in step 2 of Protocol P10 that may be required by its security policy. Then, verifier 707 creates a customer record in its database 1601 containing the information sent by subject 706 in step 2 of Protocol P10.
4. Verifier 707 computes a cryptographic hash by applying a collision-resistant hash function, such as MD5 or SHA-1, to the public key of subject 706, the PKVN 902 contained in the disposable PKVC 900 sent by subject 706 in step 1 of Protocol P10 and the public key of PKVA 701 also sent in step 1 of Protocol P10.

On a repeat visit to the ecommerce web site, the following Protocol P11 is employed by subject 706 to prove its identity and by verifier 707 to retrieve the customer record that was established for subject 706 in step 3 of Protocol Protocol P11
1. Subject 706 and verifier 707 establish an SSL connection. As part of the SSL handshake, subject 106 sends a client certificate chain comprising a currently valid disposable PKVC 900 and a self-signed certificate containing the public key of PKVA 701. Also as part of the SSL handshake, subject 706 demonstrates knowledge of the private key associated with the public key 901 contained in the PKVC 900. Also as part of the SSL handshake, verifier 707 uses the expiration date/time field 903 in the disposable PKVC 900 to verify that the disposable PKVC has not expired. Also as part of the SSL handshake, verifier 707 verifies the signature 904 in the disposable PKVC 900 using the public key of the PKVA 701 contained in the self-signed certificate. Verifier 707 also authenticates itself, in the usual manner, as part of the SSL handshake.
2. Verifier 707 computes a cryptographic hash by applying the same collision-resistant hash function used in step 4 of Protocol P10 to the public key of subject 706, the PKVN 902 contained in the disposable PKVC 900 sent by subject 706 in step 1 of Protocol P11, and the public key of PKVA 701 also sent in step 1 of Protocol P11.
3. Verifier 707 uses the cryptographic hash computed in step 2 of Protocol P11 to look up its hash table 1602. The look up retrieves a hash table entry containing a pointer to a record in the database 1601. Verifier 707 uses that pointer to retrieve the record that was established for the subject 706 in step 3 of Protocol P10.

CONCLUSION

In a likely scenario for tomorrow's ecommerce, a user will generate a public/private key pair and will register the public key component of the key pair with any number of ecommerce sites. On repeat visits to those sites, the user will authenticate the user by demonstrating knowledge of the corresponding private key. This scenario provides higher security than the current use of a password sent over an SSL connection, which is vulnerable because users typically use the same password for all sites. This scenario also avoids the transfer of responsibility for customer registration from the ecommerce site to a certification authority, which should be unacceptable to most ecommerce sites. A difficulty with this scenario is that, if the user's private key is compromised, the user has to notify each and every ecommerce site with which the user has registered the private key.

The present invention solves this difficulty through the use of a public key validation service (PKVS). The user registers the user's public key with the PKVS and obtains an unsigned certificate similar to the above described lightweight PKI employing disposable certificates, except that the public key is bound to a serial number rather than to the user's identity. Thus, the PKVS does not take on the responsibility of identifying the user through the registration process. The PKVS guarantees only that the serial number will be unique. Once the user has registered the public key with the PKVS and obtained the unsigned certificate, the user can obtain disposable certificates against the unsigned certificate similar to the above described lightweight PKI employing disposable certificates.

When the user registers as a customer with an ecommerce site, the user submits the user's public key, the serial number issued by the PKVS, and the public key of the PKVS. The ecommerce site computes a cryptographic hash of user's public key, the serial number issued by the PKVS, and the public key of the PKVS, and stores the hash as part of the customer record. On a subsequent visit to the site, the user presents a disposable certificate issued by the PKVS together with the public key of the PKVS. The site verifies the signature on the disposable certificate, verifies that the disposable certificate has not expired, computes the cryptographic hash of the user's public key and the serial number contained in the certificate concatenated with the public key of the PKVS, and verifies that the hash coincides with the one stored as part of the customer record.

If the private key is compromised, the user asks the PKVS to revoke the unsigned certificate. The PKVS revokes the unsigned certificate similar to the above described lightweight PKI employing disposable certificates. After the PKVS revokes the unsigned certificate, the PKVS will never again issue disposable certificates for the same serial number signed with the same private key. This will make it impossible for an attacker who knows the private key of the user to visit an ecommerce site and pretend to be the user on a repeat visit.

The present invention can also be used to validate other uses of a public key besides the example registration of the public key with an ecommerce site. Moreover, the subject may use its private/public key pair for multiple authentication purposes, and may use a different authentication method for each purpose, such as the different example authentication methods described above including: 1) authentication using traditional public key certificates; 2) authentication using disposable certificates; 3) authentication using unsigned certificates that are presented directly to the verifiers; and 4) authentication without certificates. The authentication using unsigned certificates method is suitable when there are only a few verifiers (e.g., up to a few hundred verifiers). The authentication without certificates method involves only one verifier. Each of these four methods can be modified to take advantage of a PKVA according to the present invention.

Figure 23:
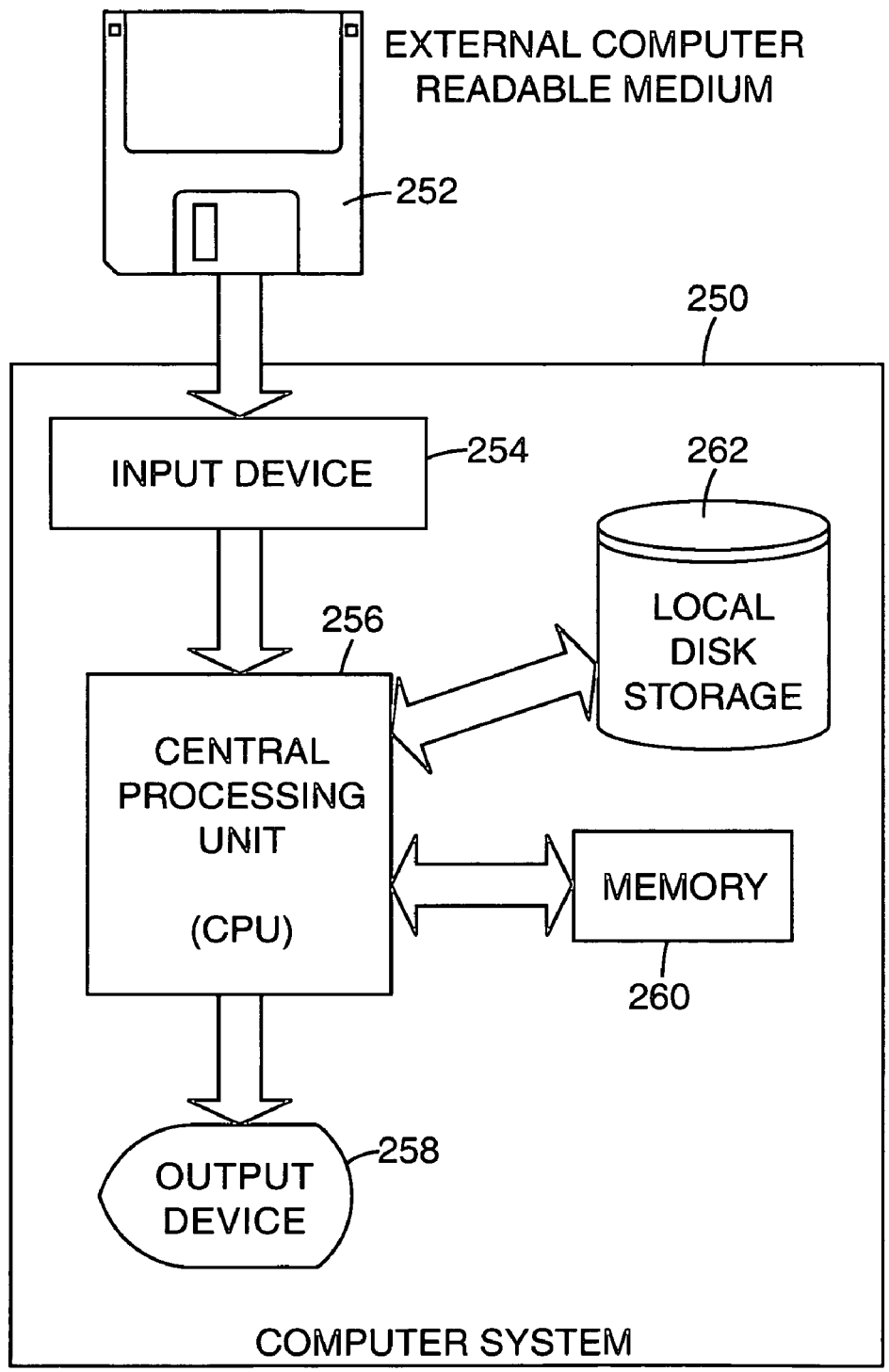
FIG. 23 is a block diagram of a computer system and a corresponding computer readable medium incorporating one or more main software program components of a PKI according to the present invention.

FIG. 23 illustrates one embodiment of a computer system 250 and an external computer readable medium 252 which can be employed according to the present invention to implement one or more of the main software program components of a PKI having a PKVS according to the present invention. Embodiments of external computer readable medium 252 include, but are not limited to: a CD-ROM, a floppy disk, and a disk cartridge. Any one of the main software program components of a PKI having a PKVS according to the present invention can be implemented in a variety of compiled and interpreted computer languages. External computer readable medium 252 stores source code, object code, executable code, shell scripts and/or dynamic link libraries for any one of the main software program components of a PKI having a PKVS according to the present invention. An input device 254 reads external computer readable medium 252 and provides this data to computer system 250. Embodiments of input device 254 include but are not limited to: a CD-ROM reader, a floppy disk drive, and a data cartridge reader.

Computer system 250 includes a central processing unit 256 for executing any one of the main software program components of a PKI having a PKVS according to the present invention. Computer system 250 also includes local disk storage 262, which is a computer readable medium for locally storing any one of the main software program components of a PKI having a PKVS according to the present invention before, during, and after execution. Any one of the main software program components of a PKI having a PKVS according to the present invention also utilizes memory 260, which is a computer readable medium within the computer system, during execution. Upon execution of any one of the main software program components of a PKI having a PKVS according to the present invention, output data is produced and directed to an output device 258. Embodiments of output device 258 include, but are not limited to: a computer display device, a printer, and/or a disk storage device.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A public key validation agent (PKVA) comprising:
an off-line registration authority configured to generate a first public key serial number (PKVN) having a high probability of being different from all other PKVNs previously generated by the registration authority, to issue a first unsigned public key validation certificate (unsigned PKVN) off-line to a subject that binds a public key of the subject to the first PKVN, and to maintain a certificate database of unsigned PKVCs in which it stores the first unsigned PKVC; and
an on-line credentials server configured to issue a disposable public key validation certificate (disposable PKVC) on-line to the subject, the disposable PKVC binds the public key of the subject from the first unsigned PKVC to the first PKVN from the first unsigned PKVC, wherein the credentials server is configured to maintain a table that contains entries corresponding to valid unsigned PKVCs stored in the certificate database.

2. The PKVA of claim 1 wherein the first PKVN is different than all previous PKVNs generated by the registration authority.

3. The PKVA of claim 1 wherein the credentials server is responsive to a revocation request from the subject to invalidate the first unsigned PKVC entry in the table of the credential server.

4. The PKVA of claim 3 wherein the registration authority generates a public key revocation code (PKRC) to be used by the subject in its revocation request.

5. The PKVA of claim 4 wherein the registration authority sends the PKRC to the subject over a secure channel that provides data confidentiality.

6. The PKVA of claim 4 wherein the revocation request that includes the PKRC previously generated by the registration authority is sent to the PKVA; and the PKVA, upon receiving the subject's revocation request, verifies that the PKRC sent by the subject coincides with the previously generated PKRC.

7. The PKVA of claim 3 wherein the credential server's response to the revocation request includes the credentials servers ceasing to issue disposable PKVCs binding the subject's public key to the first PKVN.

8. The PKVA of claim 7 wherein the credentials server's response to the revocation request includes the credentials server removing the table entry corresponding to the first unsigned PKVC.

9. The PKVA of claim 7 wherein the PKVA's response to the revocation request includes the PKVA marking the first unsigned certificate in the certificate database as being valid.

10. The PKVA of claim 1 wherein the disposable PKVC includes an expiration date/time.

11. The PKVA of claim 10 wherein a validity period from when the credentials server issues the disposable PKVC to the expiration date/time is sufficiently short such that the disposable PKVC does not need to be subject to revocation.

12. The PKVA of claim 10 wherein the disposable PKVC is not subject to revocation.

13. The PKVA of claim 1 wherein the table maintained by the credentials server is a hash table containing cryptographic hashes of valid unsigned PKVCs stored in the certificate database and including a cryptographic hash of the first unsigned PKVC.

14. The PKVA of claim 13 wherein the credentials server computes the cryptographic hash of the first unsigned PKVC with a collision-resistant hash function.

15. The PKVC of claim 14 wherein the collision-resistant hash function is a SHA-1 hash function.

16. The PKVC of claim 14 wherein the collision-resistant hash function is a MD5 hash function.

17. The PKVA of claim 1 wherein the credential server issues the disposable PKVC in response to a message from the subject containing the issued first unsigned certificate.

18. The PKVC of claim 1 wherein the disposable PKVC permits the subject to present the disposable PKVC to a verifier for authentication and for demonstrating that the subject has knowledge of a private key corresponding to the public key in the disposable PKVC.

19. The PKVA of claim 1 wherein the table maintained by the credentials server is a hash table containing cryptographic hashes of valid issued unsigned PKVCs including a cryptographic hash of the first unsigned PKVC.

20. A method for managing the validity status of a subject's public key comprising:
generating, with an off-line registration authority, a first public key serial number (PKVN) having a high probability of being different from all PKVNs previously generated by the registration authority;
issuing, with the off-line registration authority, to a subject a first unsigned public key validation certificate (unsigned PKVC) that binds a public key of the subject to the first PKVN;
maintaining, with the off-line registration authority, a certificate database of unsigned PKVCs in which the first unsigned PKVC is stored;
issuing, with an on-line credentials server, to the subject a disposable public key validation certificate (disposable PKVC), that binds the public key of the subject from the first unsigned PKVC to the first PKVN from the first unsigned PKVC; and
maintaining, with the on-line credentials server, a table that contains entries corresponding to valid unsigned PKVCs stored in the certificate database.

21. The method of claim 20 wherein the first PKVN is different than all previously-generated PKVNs.

22. The method of claim 21 further comprising generating a public key revocation code (PKRC) to be used by the subject in the revocation request.

23. The method of claim 24 further comprising sending the PKRC to the subject over a secure channel that provides data confidentiality.

24. The method of claim 20 further comprising responding to a revocation request from the subject to invalidate the first unsigned PKVC entry in the maintained table.

25. The method of claim 20 wherein the issued disposable PKVC includes an expiration date/time.

26. The method of claim 25 wherein a validity period, from when the disposable PKVC is issued to the expiration date/time, is sufficiently short such that the disposable PKVC does not need to be subject to revocation.

27. The method of claim 25 wherein the issued disposable PKVC is not subject to revocation.

28. The method of claim 20 wherein the maintained table is a hash table containing cryptographic hashes of valid unsigned PKVCs stored in the certificate database and including a cryptographic hash of the first unsigned PKVC.

29. The method of claim 28 wherein the cryptographic hash of the first unsigned PKVC is computed with a collision-resistant hash function.

30. The method of claim 29 wherein the collision-resistant hash function is a SHA-1 hash function.

31. The method of claim 29 wherein the collision-resistant hash function is a MD5 hash function.

32. The method of claim 20 wherein the disposable PKVC is issued in response to a message from the subject containing the issued first unsigned certificate.

33. The method of claim 20 wherein the issued disposable PKVC permits the subject to present the issued disposable PKVC to a verifier for authentication and for demonstrating that the subject has knowledge of a private key corresponding to the public key in the disposable PKVC.

34. The method of claim 20 wherein the maintained table is a hash table containing cryptographic hashes of valid issued unsigned PKVCs including a cryptographic hash of the first unsigned PKVC.

35. A public key infrastructure (PKI) comprising:
a subject;
a first public key validation agent (PKVA) including:
an off-line registration authority configured to generate a first public key serial number (PKVN) having a high probability of being different from all other PKVNs previously generated by the registration authority, to issue a first unsigned public key validation certificate (unsigned PKVC) off-line to a subject that binds a public key of the subject to the first PKVN, and to maintain a certificate database of unsigned PKVCs in which it stores the first unsigned PKVC; and
an on-line credentials server configured to issue a disposable public key validation certificate (disposable PKVC) on-line to the subject, the disposable PKVC binds the public key of the subject from the first unsigned PKVC to the first PKVN from the first unsigned PKVC, wherein the credentials server is configured to maintain a table that contains entries corresponding to a valid unsigned PKVCs stored in the certificate database; and a verifier configured to respond to an authentication of the subject, wherein the authentication includes ascertaining the validity of the subject's public key according to the table maintained by the credentials server.

36. The PKVA of claim 35 wherein the first PKVA is configured to respond to a request for invalidating the subject's public key, the first PKVA's response includes abstaining from issuing the disposable PKVC.

37. The PKI of claim 35 wherein the PKVA is configured to require the representation of the issued first unsigned PKVC from the subject in order to issue the disposable PKVC.

38. The PKI of claim 35 wherein the disposable PKVC is a signed certificate.

39. The PKI of claim 35 wherein the disposable PKVC is configured to expire after a selected passage of time.

40. The PKI of claim 35 wherein the disposable PKVC is configured to expire on a selected date/time.

41. The PKI of claim 35 wherein the entries in the table maintained by the credentials server are keyed by a cryptographic hash.

42. The PKI of claim 35 wherein the first PKVA is configured to respond to a request for invalidating the subject's public key.

43. The PKVA of claim 42 wherein the responding includes verifying that the request was submitted by an entity having authorization to submit a request for invalidating the subject's public key.

44. The PKVA of claim 43 wherein the responding includes requiring the presentation of a public key revocation code (PKRC) in order to invalidate the subject's public key.

45. The PKVA of claim 44 wherein the responding includes verifying that the presented PKRC coincides with the previously generated PKRC.

46. The PKVA of claim 42 wherein the responding includes altering an entry in the table maintained by the credentials server.

47. The PKVA of claim 46 wherein the altering includes changing the validity status of the subject's public key.

48. The PKVA of claim 46 wherein the altering includes removing the entry in the table maintained by the credentials server.

49. The PKVA of claim 35 wherein the responding includes altering accessibility to an entry in the table maintained by the credentials server.

50. The PKI of claim 35 wherein the registration authority is configured to authenticate the subject, the authentication comprises verifying that at least one purported identity attribute of the subject in fact applies to the subject.

51. The PKI of claim 50 wherein the registration authority is configured to respond to an assertion of the validity of the subject's public key, the assertion is based on an entry in the table maintained by the credentials server.

52. The PKI of claim 50 wherein the registration authority is configured to certify the subject's authenticity, the certification includes the first PKVN, and an identifier of the first PKVA.

* * * * *

UNITED STATES PATENT AND TRADEMARK OFFICE
CERTIFICATE OF CORRECTION

| | | |
|---|---|---|
| PATENT NO. | : 7,010,683 B2 | Page 1 of 1 |
| APPLICATION NO. | : 09/759443 | |
| DATED | : March 7, 2006 | |
| INVENTOR(S) | : Francisco Corella | |

It is certified that error appears in the above-identified patent and that said Letters Patent is hereby corrected as shown below:

On the Title page, in field (73), in "Assignee", in column 1, line 1, delete "Howlett" and insert -- Hewlett --, therefor.

In column 28, line 13, after "Protocol" insert -- P10 --.

In column 30, line 45, in Claim 1, delete "PKVN" and insert -- PKVC --, therefor.

In column 31, line 10, in Claim 7, delete "credential" and insert -- credentials --, therefor.

In column 31, line 12, in Claim 7, delete "servers" and insert -- server --, therefor.

In column 31, line 20, in Claim 9, delete "valid" and insert -- invalid --, therefor.

In column 34, line 17, in Claim 49, delete "claim 35" and insert -- claim 42 --, therefor.

Signed and Sealed this

Fourth Day of August, 2009

JOHN DOLL
*Acting Director of the United States Patent and Trademark Office*